US007627521B1

(12) United States Patent
Sheehan et al.

(10) Patent No.: US 7,627,521 B1
(45) Date of Patent: Dec. 1, 2009

(54) SYSTEM AND METHOD FOR PROCESSING MIRCOTRANSACTIONS

(75) Inventors: Mark Sheehan, Middletown, DE (US); William Wallace, Downingtown, PA (US); Lee Knackstedt, Bear, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 1421 days.

(21) Appl. No.: 10/339,596

(22) Filed: Jan. 10, 2003

Related U.S. Application Data

(60) Provisional application No. 60/348,139, filed on Jan. 15, 2002.

(51) Int. Cl.
*G06Q 40/00* (2006.01)
(52) U.S. Cl. .............................. 705/38; 705/50; 705/64; 705/80
(58) Field of Classification Search ...................... 705/1, 705/35–45, 50, 64, 80
See application file for complete search history.

(56) References Cited

U.S. PATENT DOCUMENTS

| | | | |
|---|---|---|---|
| 3,653,480 | A | 4/1972 | Yamamoto |
| 4,321,672 | A | 3/1982 | Braun |
| 4,396,985 | A | 8/1983 | Ohara |
| 4,617,457 | A | 10/1986 | Granzow |
| 4,672,377 | A | 6/1987 | Murphy |
| 4,700,055 | A | 10/1987 | Kashkashian |
| 4,797,913 | A | 1/1989 | Kaplan |
| 4,799,156 | A | 1/1989 | Shavit |
| 4,812,628 | A | 3/1989 | Boston |
| 4,823,264 | A | 4/1989 | Deming |
| 4,988,849 | A | 1/1991 | Sasaki |
| 5,023,904 | A | 6/1991 | Kaplan |
| 5,053,607 | A | 10/1991 | Carlson |

(Continued)

FOREIGN PATENT DOCUMENTS

WO       WO 02/057950        7/2002

(Continued)

OTHER PUBLICATIONS

Firstnet Challenges Big Issuers On the Internet, Card News, 14,14, Jul. 1999.*

(Continued)

*Primary Examiner*—Richard C Weisberger
(74) *Attorney, Agent, or Firm*—Goodwin Procter LLP

(57) ABSTRACT

The method and system of the invention provide a variety of techniques for processing a microtransaction, wherein the microtransaction is a low monetary amount. In accordance with the invention, the method starts with a customer initiating a purchase through interaction with a merchant. The purchase is associated with purchase information, which includes the particulars of the purchase, such as the purchase price. In the purchase, the customer uses a transaction account, obtained from a payment enabler. The merchant submits the purchase information for processing of the purchase information. Thereafter, the purchase is classified as a microtransaction, if the purchase price is below a predetermined monetary amount. Thereafter, the purchase information is forwarded for processing based on the classifying, i.e., as a result of the purchase being classified as a microtransaction. Then, upon receipt of the purchase information by an appropriate recipient, such as an interchange entity or an alternate interchange entity, the purchase information is processed to effect the microtransaction between the customer and the merchant.

32 Claims, 13 Drawing Sheets

U.S. PATENT DOCUMENTS

| | | |
|---|---|---|
| 5,054,096 A | 10/1991 | Beizer |
| 5,111,395 A | 5/1992 | Smith |
| 5,122,950 A | 6/1992 | Benton |
| 5,175,682 A | 12/1992 | Higashiyama |
| 5,198,975 A | 3/1993 | Baker |
| 5,225,978 A | 7/1993 | Petersen |
| 5,237,159 A | 8/1993 | Stephens |
| 5,237,620 A | 8/1993 | Deaton |
| 5,283,829 A | 2/1994 | Anderson |
| 5,287,269 A | 2/1994 | Dorrough |
| 5,311,594 A | 5/1994 | Penzias |
| 5,321,238 A | 6/1994 | Kamata |
| 5,326,959 A | 7/1994 | Perazza |
| 5,336,870 A | 8/1994 | Hughes |
| 5,350,906 A | 9/1994 | Brody |
| 5,367,581 A | 11/1994 | Abel et al. |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,420,405 A | 5/1995 | Chasek |
| 5,424,938 A | 6/1995 | Wagner |
| 5,430,644 A | 7/1995 | Deaton |
| 5,444,794 A | 8/1995 | Uhland |
| 5,444,841 A | 8/1995 | Glasser |
| 5,446,740 A | 8/1995 | Stratiagos |
| 5,448,471 A | 9/1995 | Deaton |
| 5,465,206 A | 11/1995 | Hilt |
| 5,479,494 A | 12/1995 | Clitherow |
| 5,479,532 A | 12/1995 | Abel |
| 5,483,445 A | 1/1996 | Pickering |
| 5,484,988 A | 1/1996 | Hills |
| 5,504,677 A | 4/1996 | Pollin |
| 5,506,691 A | 4/1996 | Bednar |
| 5,513,250 A | 4/1996 | McAllister |
| 5,537,314 A | 7/1996 | Kanter |
| 5,544,040 A | 8/1996 | Gerbaulet |
| 5,550,734 A | 8/1996 | Tater |
| 5,551,021 A | 8/1996 | Harada |
| 5,566,330 A | 10/1996 | Sheffield |
| 5,568,489 A | 10/1996 | Yien |
| 5,583,759 A | 12/1996 | Geer |
| 5,590,196 A | 12/1996 | Moreau |
| 5,592,377 A | 1/1997 | Lipkin |
| 5,592,378 A | 1/1997 | Cameron |
| 5,621,201 A | 4/1997 | Langhans |
| 5,640,577 A | 6/1997 | Scharmer |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton |
| 5,677,955 A | 10/1997 | Doggett |
| 5,679,938 A | 10/1997 | Templeton |
| 5,679,940 A | 10/1997 | Templeton |
| 5,692,132 A | 11/1997 | Hogan |
| 5,699,528 A | 12/1997 | Hogan |
| 5,703,344 A | 12/1997 | Bezy |
| 5,708,422 A | 1/1998 | Blonder |
| 5,710,889 A | 1/1998 | Clark |
| 5,715,298 A | 2/1998 | Rogers |
| 5,715,314 A | 2/1998 | Payne |
| 5,715,399 A | 2/1998 | Bezos |
| 5,724,424 A | 3/1998 | Gifford |
| 5,727,249 A | 3/1998 | Pollin |
| 5,751,842 A | 5/1998 | Riach |
| 5,770,843 A | 6/1998 | Rose et al. |
| 5,793,861 A | 8/1998 | Haigh |
| 5,794,221 A | 8/1998 | Egendorf |
| 5,802,498 A | 9/1998 | Comesanas |
| 5,819,236 A | 10/1998 | Josephson |
| 5,823,463 A | 10/1998 | Fissmann et al. |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,464 A | 11/1998 | Houvener |
| 5,835,603 A | 11/1998 | Coutts |
| 5,852,812 A | 12/1998 | Reeder |
| 5,859,419 A | 1/1999 | Wynn |
| 5,864,609 A | 1/1999 | Cross |
| 5,870,456 A | 2/1999 | Rogers |
| 5,870,721 A | 2/1999 | Norris |
| 5,870,725 A | 2/1999 | Belinger |
| 5,873,072 A | 2/1999 | Kight |
| 5,883,810 A | 3/1999 | Franklin |
| 5,884,288 A | 3/1999 | Chang |
| 5,897,625 A | 4/1999 | Gustin |
| 5,903,881 A | 5/1999 | Schrader |
| 5,910,988 A | 6/1999 | Ballard |
| 5,920,847 A | 7/1999 | Koilling |
| 5,930,778 A | 7/1999 | Geer |
| 5,940,811 A | 8/1999 | Norris |
| 5,940,844 A | 8/1999 | Cahill |
| 5,943,656 A | 8/1999 | Crooks |
| 5,945,653 A | 8/1999 | Walker |
| 5,966,698 A | 10/1999 | Pollin |
| 5,978,780 A | 11/1999 | Watson |
| 6,003,762 A | 12/1999 | Hayashida |
| 6,006,208 A | 12/1999 | Forst |
| 6,032,137 A | 2/2000 | Ballard |
| 6,038,553 A | 3/2000 | Hyde |
| 6,041,315 A | 3/2000 | Pollin |
| 6,065,675 A | 5/2000 | Teicher |
| 6,105,011 A | 8/2000 | Morrison |
| 6,111,858 A | 8/2000 | Greaves |
| 6,129,273 A | 10/2000 | Shah |
| 6,149,056 A | 11/2000 | Stinson |
| 6,338,049 B1 | 1/2002 | Walker et al. |
| 7,146,344 B2 * | 12/2006 | Wankmueller ............... 705/80 |
| 7,346,579 B2 * | 3/2008 | Matsumoto et al. ........... 705/41 |
| 2001/0018739 A1 | 8/2001 | Anderson et al. |
| 2001/0037309 A1 | 11/2001 | Vrain |
| 2001/0047334 A1 | 11/2001 | Nappe et al. |

FOREIGN PATENT DOCUMENTS

| | | |
|---|---|---|
| WO | WO 02/075499 A2 | 9/2002 |

OTHER PUBLICATIONS

Arik Hesseldahl, China Goes Smartcard Crazy, Forbes.com, Jun. 12, 2001.

Arik Hesseldahl, U.S. Getting Wise To Smart Cards, Forbes.com, May 25, 2000.

Arik Hesseldahl, Stock Focus: Smartcard Companies, Forbes.com, Jun. 18, 2001.

Kym Gilhooly, Smart Cards, Smart Move?, Computerworld.com, May 21, 2001.

Transponders: Cash In A Flash, Forbes.com, Jul. 31, 2001.

Evan Schwartz, Digital CashPayoff.

John C. Dvorak, Smartcards Get Smarter, Forbes.com, Jun. 1, 2001.

Card Flash, Daily Payment Card News, 2004 CardWeb.com Inc., Sep. 23, 2004, 3 Pages.

* cited by examiner

SYSTEM AND METHOD FOR PROCESSING MIRCOTRANSACTIONS

The subject matter of this application is related to the subject matter of Provisional Application U.S. Ser. No. 60/348,139 filed Jan. 15, 2002, assigned or under obligation of assignment to the same entity as this application, from which application priority is claimed for the present application. Provisional Application U.S. Ser. No. 60/348,139 is incorporated herein by reference in its entirety.

FIELD OF THE INVENTION

The system and method of the invention relate generally to the field of electronic commerce, and more particularly to the processing of transactions involving small monetary amounts.

BACKGROUND OF THE INVENTION

Various transaction accounts, including transaction accounts utilizing physical credit cards, for example, are commonly used in retail, business and other transactions. A consumer may use a transaction account to purchase a good or service from a merchant using that type of instrument. When the consumer interacts with the merchant to initiate the purchase using a credit account, for example, a sequence of electronic processing takes place. This processing may involve an established interchange entity such as Visa™ or Master Card™, for example. The interchange entity may interact with a lending institution or other payment enabler, such as a bank, that extends a line of credit to the customer. Each of the customer, the interchange entity, and the lending institution interact with each other pursuant to established terms of account that each party has agreed upon.

It should be appreciated that the interchange entity performs a variety of processing in conjunction with handling an electronic transaction. Various administrative and other costs are associated with this processing. As a result, the interchange entity typically charges an "interchange fee" as compensation for executing the transaction. The amount of this interchange fee may vary. Typically, the interchange fee is a percentage of the purchase. Further, a minimum interchange fee is often imposed by the interchange entity, regardless of the amount of the transaction. Illustratively, this minimum interchange fee might be a $3 charge. This minimum threshold results in problems with purchases of small monetary value.

For example, a customer may purchase an item from a merchant for $4. The selling merchant is typically responsible for paying this interchange fee to the interchange entity. If the minimum interchange fee is $3, the merchant's net receipt on selling the item is $1, i.e., $4−$3=$1. This return may not even cover the cost of the item, and certainly reduces or eliminates the possibility of a profit margin for the merchant.

Accordingly, transactions of a low monetary amount are typically not processed using a transaction account, such as a credit card account, to which an interchange fee is applied. However, a significant portion of the transactions effectuated in the national economy are small dollar sales. It would consequently be beneficial in a wide variety of situations if a transaction account could be used to pay for low monetary amount transactions. In one regard, these low monetary amount transactions may be characterized as "microtransactions." As used herein, a "microtransaction" may be or include any transaction between a first person or entity and a second person or entity in which the cost of an interchange or other processing fee might discourage such transactions from taking place. Other problems exist.

SUMMARY OF THE INVENTION

The invention addressing the problems above, as well as others, relates in one regard to a system and method for processing microtransactions in conjunction with operation of an interchange entity, while still maintaining transaction viability for the merchant and other participants.

In accordance with an embodiment of the invention, the inventive method may begin with a customer interacting with a merchant to initiate a purchase. Illustratively, this interaction might be performed using a client machine connected to the Internet. The purchase is associated with purchase information, which includes the particulars of the purchase, such as the purchase price, quantity, tax and other data. In the purchase, the customer may identify a payment enabler transaction account. The merchant submits the purchase information for processing of the purchase information. For example, the submission of the purchase information might simply include the merchant entering information into a cash register or other point of sale or other terminal.

The purchase may be classified as a microtransaction if the purchase price falls below a predetermined monetary amount. If so, then the purchase information may be forwarded for differential processing based on that classification, i.e., as a result of the purchase being classified as a microtransaction. Subsequently, upon receipt of the purchase information by a recipient, such as an interchange entity, or an alternate interchange entity, the purchase information may be processed to effect the microtransaction between the customer and the merchant.

In accordance with one embodiment of the invention, an alternate interchange entity is utilized in lieu of the traditional interchange entity. This alternate interchange entity may process the microtransaction charging a lower interchange fee.

In accordance with another embodiment of the invention, a merchant processing a pending transaction may, for example, interact with an alternate interchange entity. The alternate interchange entity may in turn interact with a traditional interchange entity. In this embodiment, the alternate interchange entity may collect or "pool" a plurality of microtransactions from one customer or a number of customers. Once the pool is formed into an aggregated transaction, the alternate interchange entity may forward the aggregated transaction to the interchange entity for processing as a single transaction. As a result, only one traditional interchange fee may be recorded against one cumulative transaction, reducing the incurred interchange expense.

In accordance with another embodiment of the invention, the merchant processing the pending transaction may interact directly with the interchange entity. In this embodiment, the interchange entity utilizes different protocols for a microtransaction and a non-microtransaction to trigger differentiated processing for each.

These and other aspects and advantages of the invention will be apparent from the detailed description which follows.

DETAILED DESCRIPTION OF PREFERRED EMBODIMENTS

Figure 1:
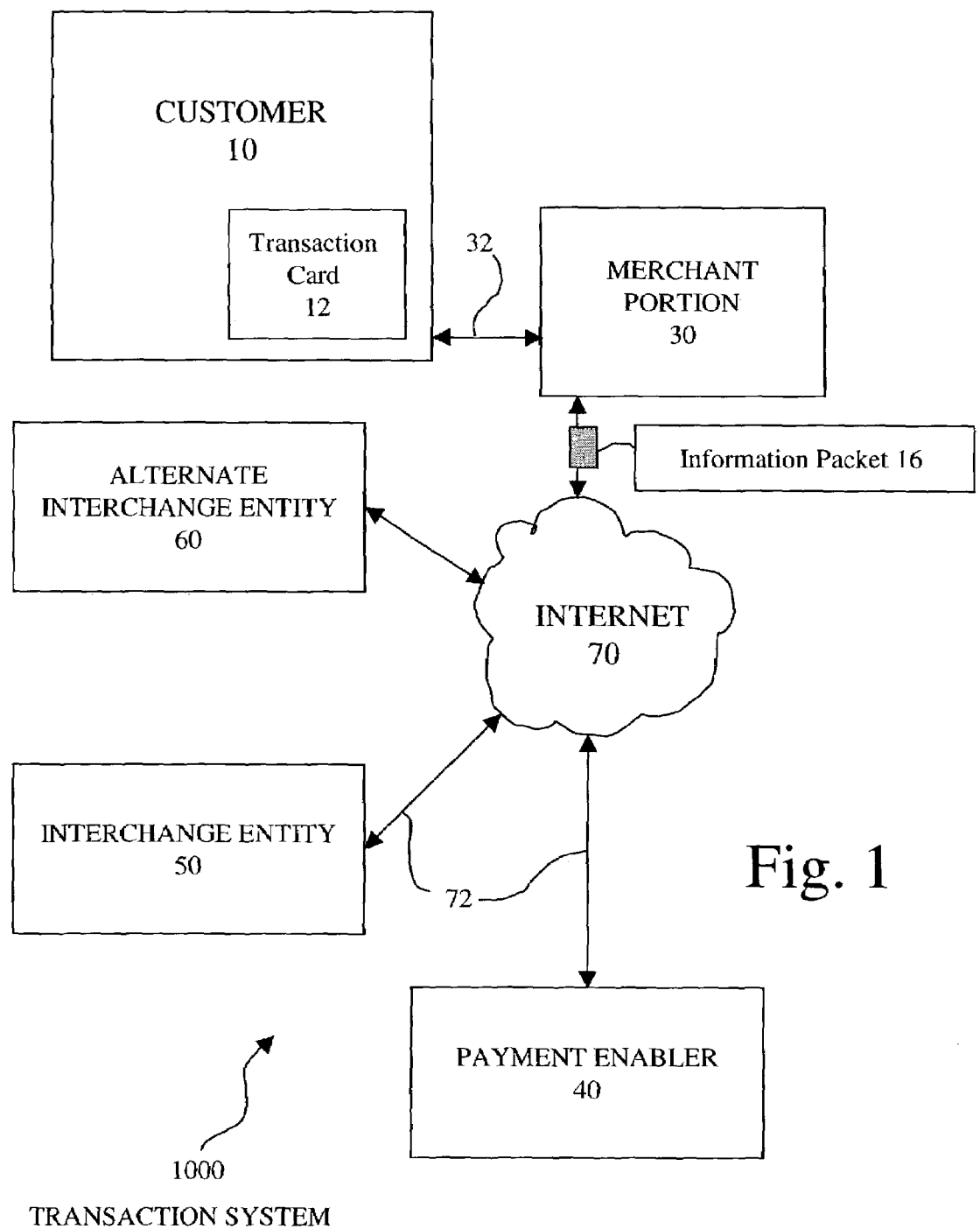
FIG. 1 is a block diagram showing a transaction system according to one embodiment of the invention.

The invention provides a method and system for viably processing a microtransaction of a low monetary amount. As used herein, any term in the singular may be interpreted to be in the plural, and alternatively, any term in the plural may be interpreted to be in the singular.

In accordance with one embodiment, the method of the invention may be initiated by a customer making a purchase. It should be appreciated that purchase information, such as the customer's name, account number, dollar amount of the transaction, tax amount, date, time, location and other data, for example, may be associated with the purchase. Illustratively, the customer may interact with a merchant over the Internet using a computer or other client, for instance using a browser interface. Alternatively, the customer may interact with a merchant in a person to person situation, or via a telephone call center or other channel. The customer may use a payment enabler transaction card, which is issued by a payment enabler such as a credit card issuer. Further, the payment enabler transaction card may be supported by or compatible with systems of an interchange entity.

Once the customer initiates the purchase by the customer's interaction with a merchant, for example, the merchant may submit the purchase information to process the purchase information and effect the transaction. For example, the submission of the purchase information might include the merchant entering information into a cash register or other point of sale or other terminal. Alternatively, the submission may be performed over the Internet and include the merchant interfacing with a Website, using HTML, XML or other code or protocols, for example. When the merchant transmits the purchase information, in accordance with one embodiment of the invention, the purchase may be tested for classification as a microtransaction, for instance by testing if the total amount of the purchase price is below a predetermined threshold. Once the purchase has been classified as a microtransaction, regular or other transaction, the purchase information may thereafter be forwarded based on that classification.

As described above, a merchant may submit purchase information using the Internet. This is one illustrative situation in which a fee might be imposed upon the merchant submitting the information. For example, the fee may be imposed, in some logical manner, based on the data submitted by the merchant. This approach may be characterized as a "pay for byte" approach.

Alternatively, other fee arrangements might be imposed by which an alternate interchange entity as described below, for example, might collect a small fee for the microtransaction. For example, a customer and/or a merchant effecting a microtransaction might be forwarded to a Website maintained by an alternate interchange entity. In order to effect the microtransaction, the customer and/or merchant may be required to "click" through various pages on the website, in some logical manner. This passage through the pages will result in effecting the desired microtransaction. In addition, a fee may be incurred by the customer and/or the merchant as the customer and/or a merchant clicks on a certain page or pages in the website. Accordingly, a fee arrangement may be used that may be characterized as a "pay for click" arrangement, in accordance with one embodiment of the invention. Other fee arrangements may also be utilized by which the alternate interchange entity, for example, collects a nominal fee for the microtransaction.

As described herein, a "pool" of funds may be used in conjunction with the microtransaction processing of the invention. The above-described "pay for click" arrangement may result in a debit or a credit, in accordance with embodiments of the invention. To explain, if a particular user clicks to access a particular information page in a website, for example, that user might pay a five-cent fee for that access. Such a five-cent debit may then be deducted from the microtransaction pool that is associated with that particular user. This association might be provided in any suitable manner, such as through a communication between the user's computer and the entity maintaining the pool of funds.

Further, the user's action might result in a credit to the pool, which is associated with the user. That is, the user might click on an advertisement in a web page. However, in contrast to the "'pay for click" or "pay for byte" arrangement, the user's pool is then credited five cents for viewing the advertisement. Any of a wide variety of other arrangements may be employed in which a funds pool, which is associated with a user as discussed in detail below, is debited or credited based on the actions of the user, i.e., whether the user clicks on a particular link, for example. In short, the actions of the user result in continued adjustment of the dollar amount in the funds pool. As described below, the funds pool is used to effect microtransactions.

As described in detail below, purchase information, which relates to a purchase by a customer, may be forwarded to an interchange entity, to an alternate interchange entity, or to both. For example, the purchase information might be forwarded over the Internet. Once the purchase information has been forwarded to the interchange entity or the alternate interchange entity, the purchase information will be processed to effect, i.e., to complete, the microtransaction between the customer and the merchant. The various aspects of the method of the invention will be described below.

It should be appreciated that a merchant may use the systems and methods of the invention to process microtransactions for any of a variety of reasons. For example, a so called fast-food restaurant may use the method of the invention to provide customers the convenience of using a credit card. As described herein, the method of the invention, in processing microtransactions, provides faster processing for credit card transactions as compared with traditional credit card transactions. However, the faster processing may be accompanied by reduced authorization and/or approval procedures. Accordingly, in accordance with some embodiments, the invention may be more susceptible to fraudulent transactions than traditional credit card transactions. However, for example, a merchant may deem that the appeal of offering customers the use of credit cards may increase business and throughput. As a result, a merchant may implement the processing of microtransactions, with the knowledge that the increase in fraudulent transactions will be off-set by the increased business. In short, the risk of losing a hamburger every fifty transactions may be outweighed by the increased throughput, for example. The systems and methods of the invention may be used in any of a wide variety of other business environments. Further, any of a variety of circumstantial reasons may justify a merchant to use the systems and methods of the invention, i.e., so as to process microtransactions.

In accordance with a further aspect of the invention, the throughput of transactions may actually trigger the initiation of microtransaction processing. That is, for example, during off-peak hours, traditional credit card processing may be used by a fast-food merchant. However, once the throughput increases above a certain threshold level, the processing systems of the merchant might automatically switch to performing the microtransactions of the invention. The threshold might be based on any of a variety of parameters such as a mathematical calculation weighing risk against the benefit of the high throughput, which is afforded by using microtransaction processing.

As should be appreciated, the microtransaction processing of the invention may be particularly useful in the environment of the Internet and transactions over the Internet. For example, one illustrative scenario might occur when a first user solicits a second user to find an item of information. The first user might post the request for information in a chat room, for example. The second user observes the request in the chat room and, for a five dollar fee, conducts searching on the Internet to find and report the item of information to the first user. The second user might be characterized as a bounty hunter of sorts. This low dollar amount transaction, as well as a wide variety of other transactions, may effectively use the microtransaction processing, in accordance with the various embodiments of the invention. Further, such a transaction might effect an associated "funds pool" of each of the first user and the second user, i.e., so as to adjust the balance in each of the respective user's funds pool, as is described below.

As used herein, a "payment enabler" may be a financial institution, such as a bank, or any other entity that controls and/or monitors an account for a customer. Further, an "interchange entity" as used herein might be Visa or Master Card, for example, or any other entity that serves to process transactions that are effected by a customer for an account, wherein such account is controlled and/or monitored by a payment enabler.

Further, as used herein, a "customer" means any person, device, mechanism or other entity purchasing or leasing an item, any person or entity obtaining services, or any person or entity performing any other type of transaction, for example. Further, a "merchant" as used herein, means any entity that interacts with the customer in effecting a transaction, such as a purchase or lease of goods, a purchase of services, or any other activity or transaction in which a customer might engage, for example.

As used herein, the term "purchase" means any transaction effected by a person or an entity, i.e., a customer. Accordingly, a customer making a purchase might be a person or entity purchasing an item, a person obtaining personal services, or an entity performing any other type of transaction, for example.

Accordingly, a customer might be in the form of a robotic entity that periodically downloads software from a software provider, i.e., a merchant. Illustratively, a $2 charge, i.e., a microtransaction, is associated with each download. The various embodiments of the system and method of the invention may be used to effect a recurring microtransaction in such a situation.

FIG. 1 is a block diagram showing an exemplary transaction system 1000, which utilizes the method of the invention in accordance with one embodiment. As shown in FIG. 1, the transaction system 1000 includes a customer 10, a merchant portion 30 and a payment enabler 40. The merchant portion 30 is representative of any merchant that interacts with the customer to effect a transaction. Further, the transaction system 1000 includes an interchange entity 50 and an alternate interchange entity 60. These various components of the transaction system 1000 perform a variety of activities utilizing the processes of the invention, as described herein. The interchange entity 50 may be characterized as a "traditional interchange entity" in that it processes transactions in a traditional manner charging the typical interchange fee. In contrast, the "alternate interchange entity" 60 processes transactions in accordance with the systems and methods of the invention as described herein.

As shown in FIG. 1, the customer 10 interacts with the merchant portion 30 utilizing a communication interface 32. The communication interface 32 may be in the form of a network or over the Internet, for example. Alternatively, it should be appreciated that the communication interface 32 may simply be in the form of verbal communication between the customer 10 and the merchant portion 30, in conjunction with the use of a transaction card 12, i.e., a type of transaction account. In accordance with the example of FIG. 1, the transaction card 12 is in the possession of the customer 10 and may be used to effect purchases.

As used herein, a "transaction account" and/or a "payment enabler transaction account" means any account or physical card or other payment device, for example, that is used by a customer that allows that customer to perform any of a wide variety of transactions, which relate to such account or payment vehicle or device. For example, the transaction account might be in the form of a credit card, debit card, stored value card, smart card, or any other type of card, electronic account, or payment device or vehicle, such as a radio frequency identification device associated with an account. Further, transactions performed utilizing the transaction account include electronically accessing funds, mutual funds, money market accounts, margin accounts, bank accounts, sweeps card accounts, a line of credit, stock information, electronically accessing information such as address information, or performing other transactions, for example. In accordance with some embodiments of the invention, the invention may use a variety of devices, which the customer carries, so as to initiate the microtransaction, i.e., such as a plastic credit card type device, a radio frequency identification device as noted above, or other data carrying device, for example. Such a device might trigger microtransaction processing, as described herein, directly, i.e., such that the transaction is automatically passed on to a microtransaction network.

With further reference to FIG. 1, the merchant portion 30 collects a variety of information from the customer 10, some or all of which may contained on the transaction card 12, in accordance with one embodiment of the invention, and submits that information for processing. Illustratively, as shown in FIG. 1, the information may be submitted for processing utilizing an information packet 16, i.e., a collection of data. As described below, the information packet 16 may be transmitted over the Internet 70, for example, to the interchange entity 50 or the alternate interchange entity 60. The Internet 70 may utilize a suitable medium 72 to support the communications between the various components of the transaction system 100, such as a telephone network. It should of course be appreciated that communications between the components of a transaction system 1000 may be performed over other communication systems, and is not limited to the Internet.

Figure 2:
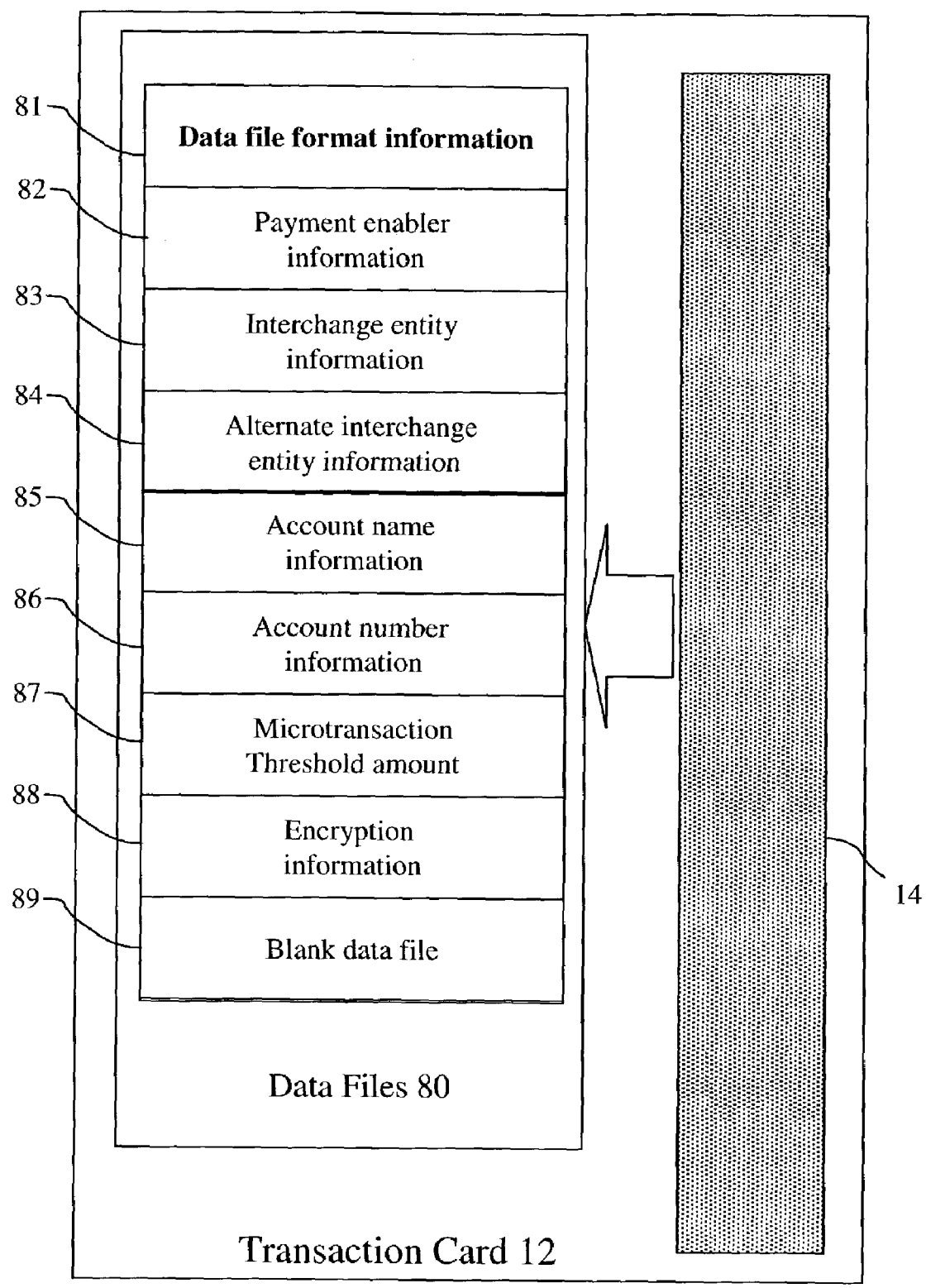
FIG. 2 is a diagram showing a transaction card, which is utilized in the transaction system, according to one embodiment of the invention.

As described above, a customer 10 possesses and utilizes a transaction card 12, or similar device, to effect a transaction with the merchant portion 30. FIG. 2 is a diagram showing the transaction card 12 in further detail, in accordance with one embodiment of the invention.

The transaction card 12 may physically be in the form of a typical credit card, for example. As shown in FIG. 2, the transaction card 12 includes a magnetic strip 14. The magnetic strip 14 may contain any of a wide variety of data. In further explanation of the systems and methods of the invention, such data contained on the magnetic strip 14 is shown in FIG. 2 as data files 80.

The data files 80 contain a variety of files 81-89. As should be appreciated, the data files 80 contain a data file format information file 81. The data file format information file 81 is utilized to maintain the various files, as is known in the art. Further, the data files 80 contain information regarding the particular customer possessing the transaction card 12, as well as the various entities with which that customer interacts in doing business with the transaction card 12. Accordingly, the data files 80 include payment enabler information file 82, and an interchange entity information file 83. Further, in accordance with embodiments of the invention, the data files 80 also include an alternate interchange entity information file 84. The data files 80, as shown in FIG. 2, further include an account name information file 85, an account number information file 86, as well as an encryption information file 88. Further, the data files 80 include a blank data file 89. The blank data file 89 may be used to contain data as is desired or necessary.

With respect to the encryption information file 88, it should be appreciated that the systems and methods of the invention may utilize known encryption techniques in sending, receiving and storing confidential data, such as using PKI (Public Key Infrastructures). PKI refers to systems for managing public and private keys and credentials used in public key cryptography systems. PKI provides the attributes of confidentiality, message integrity, authentication of the identity of the key holder, nonrepudiation of the transaction by the key holder, and authorization, all of which are desired for secure financial transactions. It should be appreciated that the methods of the invention, and the various communications utilized in the invention, may use PKI, as well as other encryption techniques.

In further reference to FIG. 2, the data files 80 may include a microtransaction threshold amount file 87, as is described below. The microtransaction threshold amount file 87 controls the classification of a particular transaction as being a microtransaction. As a result, the microtransaction threshold amount 87 effects the manner in which a particular transaction is processed, as well as the particular entity that is performing the processing of the transaction. Further aspects of the transaction card 12 will be described below.

Figure 3:
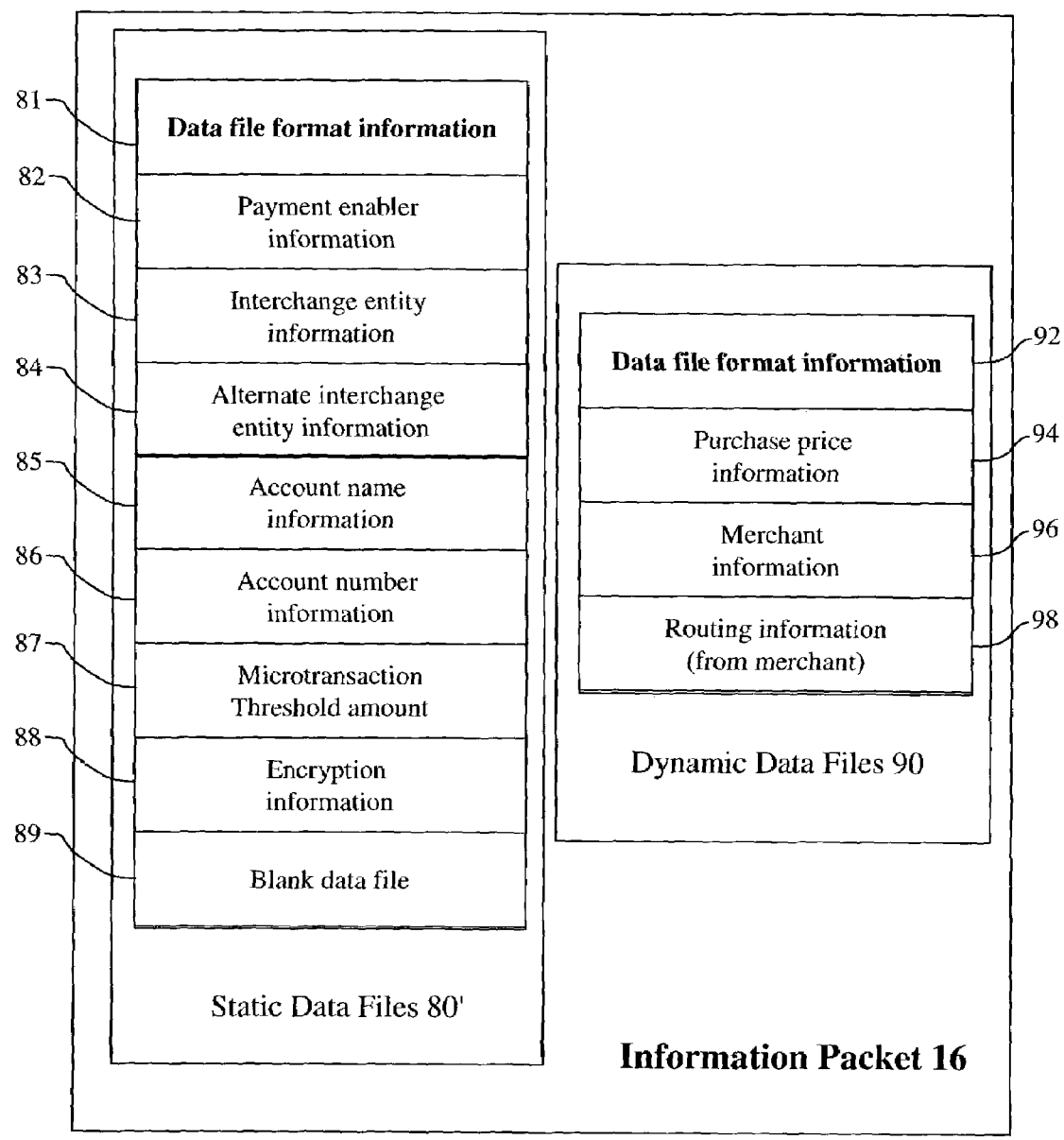
FIG. 3 is a diagram showing an information packet, which is utilized in the transaction system, according to one embodiment of the invention.

FIG. 3 is a diagram showing further details of the information packet 16. As described above, a customer 10 interacts with a merchant portion 30 utilizing a transaction card 12. This interaction between the customer 10 and the merchant portion 30 results in the initiation of a transaction. In order to process the transaction, the merchant portion 30 collects various data from the customer 10 and the customer's transaction card 12, and places that data into an information packet 16. As illustrated in FIG. 1, the information packet 16 is then output from the merchant portion 30 to an appropriate recipient. FIG. 3 is a diagram showing further details of the information packet 16.

As shown in FIG. 3, the information packet 16 includes both static data files 80 and dynamic data files 90. The static data files 80 contain information that will not vary between the various purchases of a customer. That is, the static data files 80 contain the same information as the data files 80, which are contained in the transaction card 12, described above.

Further, the information packet 16 includes dynamic data files 90. The dynamic data files 90 change from one purchase to a next, for example. The dynamic data files 90 include a data file format information file 92, which organizes the various information in the dynamic data files 90. Further, the dynamic data files 90 include a purchase price information file 94, a merchant information file 96, and a routing information file 98.

The purchase price information file 94 contains data regarding the purchase price for a particular transaction. Further, the merchant information file 96 is a data file that contains information regarding a particular merchant, with which the customer 10 has interacted to initiate the transaction. Further, the routing information file 98 contains information relating to routing of the information packet 16. For example, the routing information 98 may contain information regarding routing of the information packet 16 to an interchange entity 50, an alternate interchange entity 60, or alternatively a payment enabler 40. For example, the routing information 98 may be provided by a customer or merchant, may be imbedded on the transaction card 12, or may be generated based on information from both the transaction card 12 and the merchant portion 30, for example.

Figure 4:
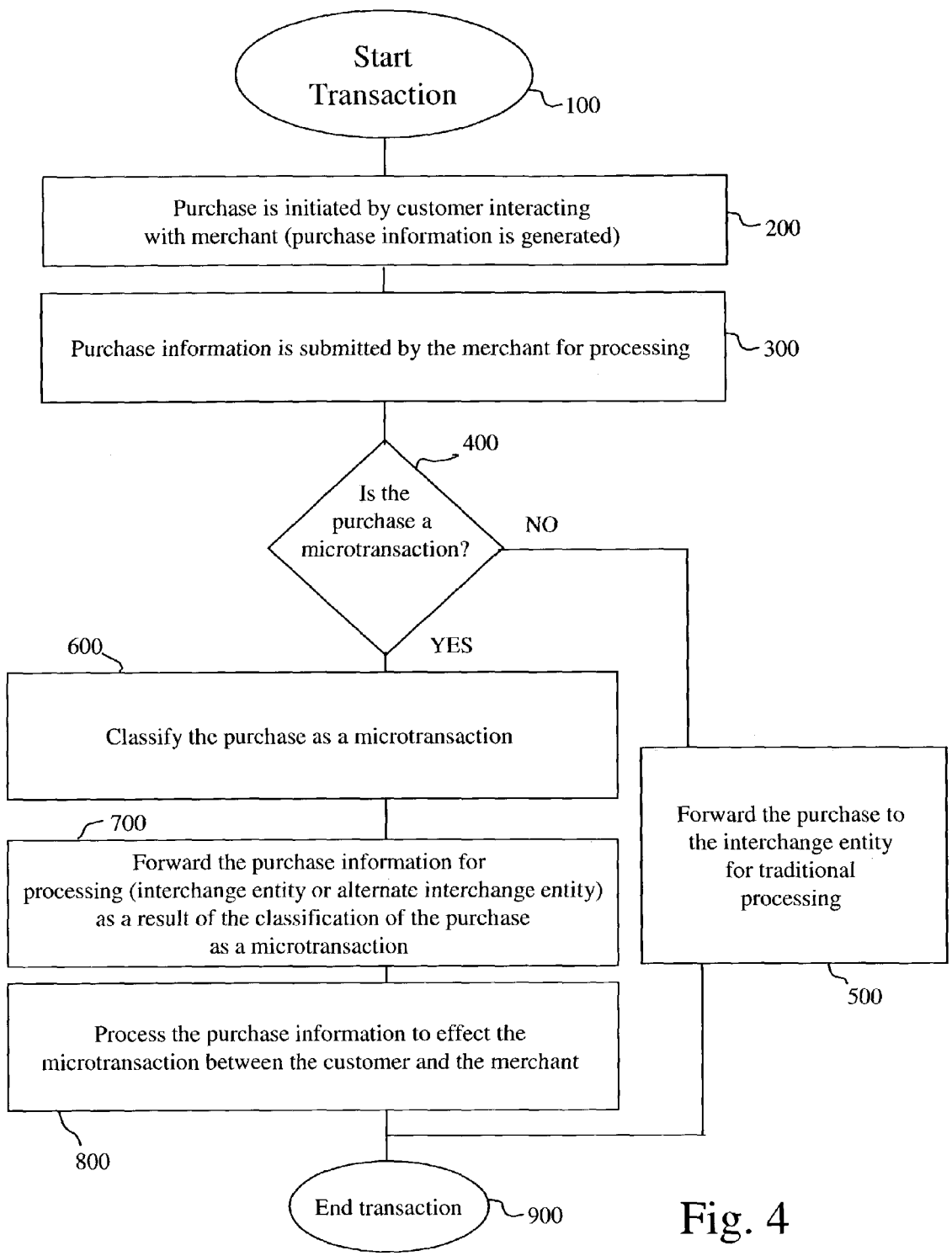
FIG. 4 is a high-level flow chart showing the processing of a microtransaction according to one embodiment of the invention.

Hereinafter, FIG. 4-FIG. 13 will be described in conjunction with the transaction system 1000 of FIG. 1. In particular, FIG. 4 is high level flow chart showing the process in accordance with one embodiment of the invention. The various steps of the process as set forth in FIG. 4 will be described in further detail in the flow charts of FIG. 5-FIG. 13. That is, the flow charts of FIG. 5-FIG. 13 describe various embodiments of the high level process set forth in the flow chart of FIG. 4.

As shown in FIG. 4, the process in accordance with one embodiment of the invention is initiated in step 100, at which time a transaction is initiated. After step 100, the process passes to step 200. In step 200, a purchase is initiated by a customer 10 interacting with a merchant 30. As a result of this interaction, purchase information is generated. This purchase information may be obtained from each of the transaction card 12, the customer 10, and/or the merchant portion 30. After step 200, the process passes to step 300. In step 300, the merchant portion 30, i.e. a merchant interacting with the customer, submits the purchase information for processing. As described above, this submission may be in the form of transmitting an information packet 16. After step 300, the process passes to step 400.

In step 400, a determination is made whether the purchase is a microtransaction. It should be appreciated that this determination may be performed before the information packet 16 is transmitted by the merchant portion 30. This approach might in particular be used in a situation in which the interchange entity, or the alternate interchange entity, imposes a fee upon receipt of the information packet. That is, in accordance with this embodiment, the merchant portion 30, utilizing the transaction card 12, determines whether the particular transaction is a microtransaction. As a result of this determination, the information packet 16 is then output to an appropriate recipient, i.e., the interchange entity, or the alternate interchange entity, for example. However, it should be appreciated that the determination that a transaction is a microtransaction may be performed at some other suitable point in the processing. For example, the determination that the transaction is a microtransaction might be determined at a suitable alternate interchange entity, in accordance with one embodiment of the invention. That is, an alternate interchange entity might be disposed between the merchant and the normal interchange entity. This alternate interchange entity would then intercept and process microtransactions, while forwarding on non-microtransactions to the normal interchange entity for normal processing.

In step 400, the merchant portion 30 may determine that the purchase is not a microtransaction. As a result, the process passes to step 500. In step 500, the merchant portion 30 forwards the purchase information to the interchange entity 50 for traditional processing. That is, since the monetary amount of the purchase price is not low enough to classify the purchase as a microtransaction, typical processing may take place between the merchant, the interchange entity 50 and the payment enabler 40. After step 500, as described above, the process passes to step 900.

Alternatively, the merchant portion 30 may determine that the purchase is indeed a microtransaction. As a result, the process passes to step 600. In step 600, the purchase is classified as a microtransaction. Then, the process passes to step 700. In step 700, in accordance with this embodiment, the merchant portion 30 forwards the purchase information for processing, as a result of the classification of the purchase as a microtransaction. In accordance with the various embodiments of the invention, the purchase information might be forwarded to an interchange entity 50, or alternatively, may be forwarded to an alternate interchange entity. After step 700, the process passes to step 800.

In step 800, the entity receiving the purchase information, i.e. whether it be the interchange entity 50 or alternate interchange entity 60, processes the purchase information to effect the microtransaction between the customer and the merchant. After step 800, the process passes to step 900 as shown in FIG. 4. In step 900, the transaction is terminated.

Figure 5:
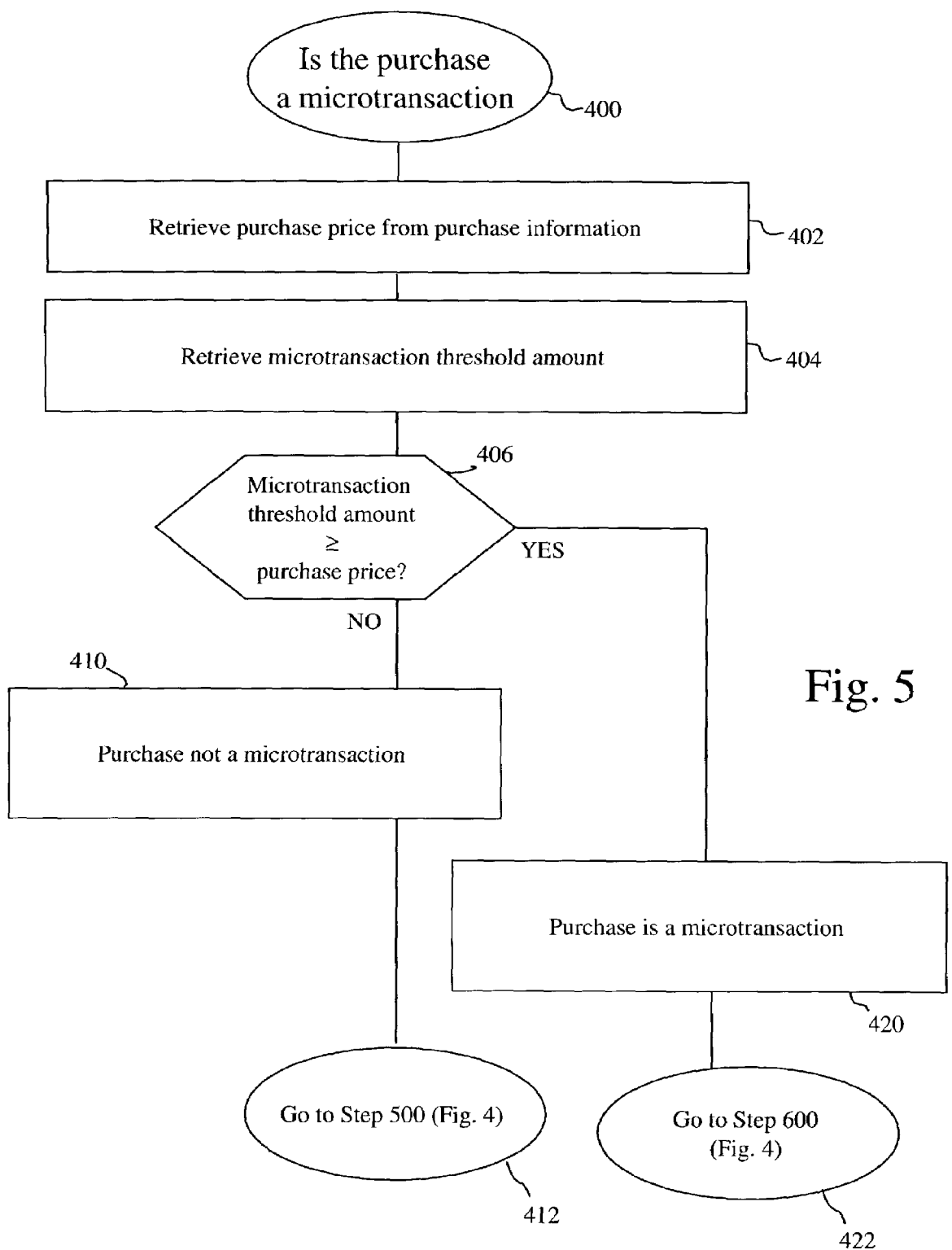
FIG. 5 is a flow chart showing the "Is the purchase a microtransaction" step of FIG. 4 in further detail according to one embodiment of the invention.

FIG. 5 is a flow chart showing the features of FIG. 4 in further detail. Specifically, FIG. 5 shows the step of "is the purchase a microtransaction?" step 400 of FIG. 4 in further detail.

As shown in FIG. 5, the process starts in step 400. After step 400, the process passes to step 402. In step 402, the merchant portion 30 retrieves the purchase price, i.e., the amount of the transaction, from the purchase information. Then, in step 404, the merchant portion 30 retrieves a microtransaction threshold amount 404. For example, this information might be obtained from the microtransaction threshold amount file 87 in the transaction card 12.

After step 404, the process passes to step 406. In step 406, the merchant portion 30 determines whether the microtransaction threshold amount is greater than or equal to the purchase price. If yes, then the process passes from step 406 to step 420 in which the purchase is determined to be a microtransaction. After step 420, as shown in FIG. 5, the process passes to step 422. In step 422, the process advances to step 600, as shown in FIG. 4.

Alternatively, the transaction may not be a microtransaction. Accordingly, the process passes from step 406 to step 410 in which the purchase is determined to not be a microtransaction. After step 410, the process passes to step 412. In step 412, the process passes to step 500, as shown in FIG. 4.

Figure 6:
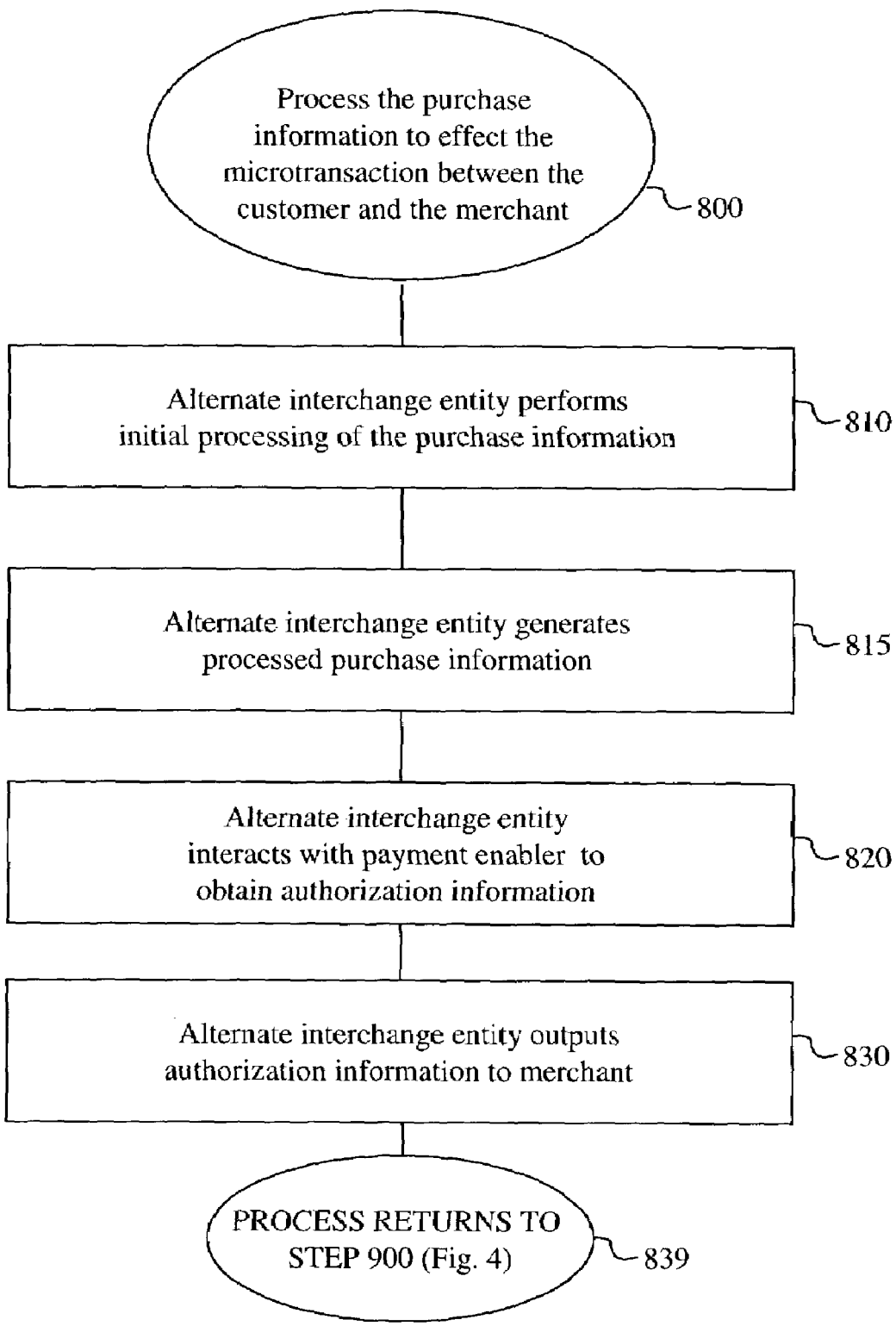
FIG. 6 is a flow chart showing the "Process the purchase information to effect the microtransaction between the customer and the merchant" step of FIG. 4 in further detail according to one embodiment of the invention.

FIG. 6 is a flowchart showing in further detail the "process the purchase information to effect the microtransaction between the customer and the merchant." step 800 of FIG. 4, in accordance with one embodiment of the invention. In accordance with this embodiment, the purchase information has been forwarded directly to an alternate interchange entity 60. As described above, this routing may be controlled by the routing information 98 in the information packet 16. Further, the merchant or customer might dictate the particular routing, i.e., so as to select a particular embodiment of the invention that is chosen and implemented. This might be performed by the customer entering a suitable code when initiating the transaction for example, or alternatively, in some other suitable manner.

Once the purchase information is received by the alternate interchange entity, initial processing of the purchase information is performed, as illustrated in step 810 of FIG. 6. After step 810, the process passes to step 815. In step 815, the alternate interchange entity generates processed purchase information. That is, the purchase information may be processed in a suitable manner as is desired or necessary by the alternate interchange entity. This processed purchase information is then forwarded to a payment enabler. Accordingly, the flowchart of FIG. 6 illustrates a situation, in accordance with one embodiment of the invention, in which the alternate interchange entity interacts directly with the payment enabler.

Accordingly, in step 820 of FIG. 6, the alternate interchange entity interacts with the payment enabler 40 to obtain authorization information for the particular transaction requested by the customer 10. After step 820, the process passes to step 830 as shown in FIG. 6. In step 830, the alternate interchange entity, which has previously obtained "authorization information" from the payment enabler 40, outputs this authorization information to the merchant portion 30.

Further details of each of step 820 and step 830 are described below. After step 830, the process passes to step 839. In step 839, the process returns to step 900, as shown in FIG. 4.

Figure 7:
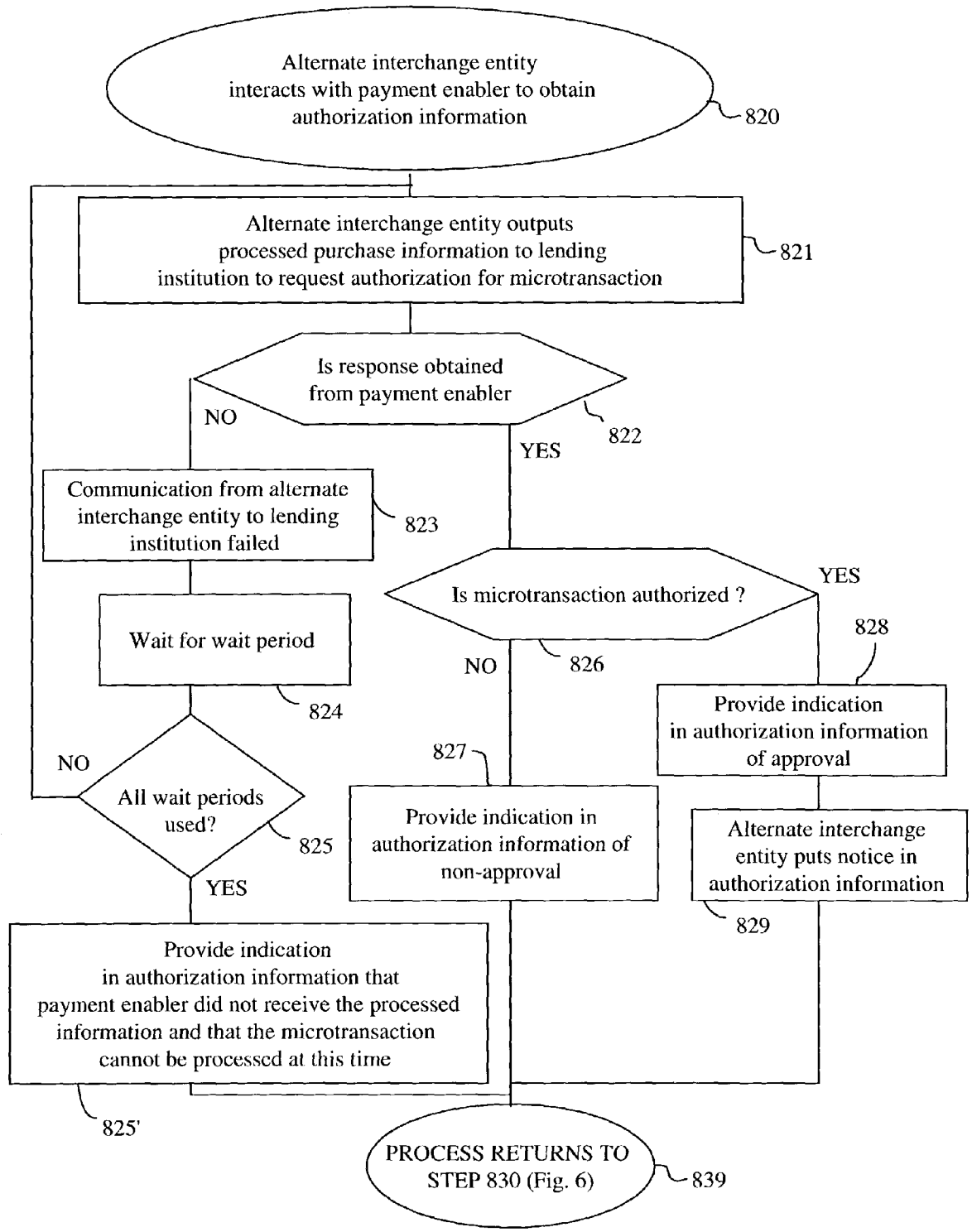
FIG. 7 is a flow chart showing the "alternate interchange entity interacts with payment enabler to obtain authorization information" step of FIG. 6 in further detail according to one embodiment of the invention.

FIG. 7 is a flowchart showing in further detail the "alternate interchange entity interacts with payment enabler to obtain authorization information" step of FIG. 6. After the subprocess starts in step 820, the process passes to step 821 as shown in FIG. 7. Step 821 illustrates that the alternate interchange entity outputs processed purchase information to the payment enabler to request authorization for the microtransaction.

Then, the process passes to step 822. In step 822, the alternate interchange entity 60 performs a determination whether a response is received from the payment enabler.

That is, it should be appreciated that the alternate interchange entity 60 may not possess as established a network or communication capabilities as the interchange entity 50. Accordingly, it may be more likely that an alternate interchange entity 60 may not be able to communicate with the payment enabler 40, than if the transaction was processed directly through the interchange entity 50. However, this may be characterized as a "trade-off" of sorts since interchange fees are avoided for the microtransaction, i.e., as a result of being processed by the alternate interchange entity 60.

In further explanation of this aspect of the invention, FIG. 7 illustrates that a response may not be obtained from the payment enabler. As a result, the process passes to step 823 as shown in FIG. 7. In step 823, the process determines that the communication from the alternate interchange entity to the payment enabler failed. Then, the process passes to step 824 in which a wait period is initiated. It should be appreciated that this wait period may very substantially based on the particular circumstances of the transaction being effected between the merchant and the customer.

After step 824, the process passes to step 825 in which a determination is made whether all the wait periods have been used. If yes, then in step 825' the alternate interchange entity generates an indication, which may be contained in the authorization information, that the payment enabler did not receive the processed information and that the microtransaction cannot be processed at this time. Then, the process passes to step 839. In step 839, the process returns to step 830, as shown in FIG. 6.

Alternatively, the process may determine in step 825 that all the wait periods have not been used. As a result, the process passes from step 825 back to step 821. Thereafter, the processing proceeds as described above.

In accordance with a further aspect of the invention, it should be appreciated that the merchant portion 30 may not be able to communicate with the alternate interchange entity 60, i.e., rather than the alternate interchange entity 60 not being able to communicate with the payment enabler 40. Accordingly, the alternate interchange entity information file 84, for example, might contain an appropriate notice in this situation. For example, such a notice might be conveyed to the customer 10, through the merchant 30, that this particular transaction is a microtransaction, and further, that the alternate interchange entity could not be contacted to process this microtransaction. Thereafter, the customer might be given the option to proceed with the transaction utilizing the interchange entity 50 in the typical manner, and, as a result, incur the typical interchange fee. However, it should of course be appreciated that in this situation, the interchange fee might exceed the actual purchase amount of the microtransaction.

In further explanation of FIG. 7, the alternate interchange entity may be successful in communicating with the payment enabler. As a result, the process passes from step 822 to step 826. In step 826, the alternate interchange entity, based on information received from the payment enabler 40, performs a determination whether the microtransaction is authorized. The authorization may be determined in any suitable manner. If no, i.e., the microtransaction is not authorized, then the process passes from step 826 to step 827. In step 827, the alternate interchange entity 60 provides an indication in the generation of authorization information, which will be forwarded to the merchant portion 30, of the non-approval. After step 827, the process passes to step 839. In step 839, the process returns to step 830, as shown in FIG. 6.

Alternatively, authorization may be obtained for the microtransaction. As a result, the process passes from step 826 to step 828. In step 828, the alternate interchange entity 60 provides an indication, in the authorization information, of approval. Then, the process passes to step 829.

In step 829, the alternate interchange entity may place a further suitable notice in the authorization information. For example, such a notice may contain information indicating that the terms of the agreement between the customer and the interchange entity will not apply to the transaction, i.e., since the interchange entity is not handling the transaction. Alternatively, or in addition to, the customer notice may further include an indication that the terms of agreement between the customer and the alternate interchange entity will be applied to the microtransaction. The terms of such agreement may have previously been agreed upon by the customer 10, the payment enabler 40, and/or the alternate interchange entity 60, as well as the interchange entity 50. After step 829, the process passes to step 839. In step 839, the process returns to step 830, as shown in FIG. 6.

As described above with reference to step 820 of FIG. 6, the alternate interchange entity interacts with the payment enabler to obtain authorization information. A particular embodiment of the process step 820 is described above in conjunction with FIG. 7. However, the system and method of the invention are not limited to the process of FIG. 7. That is, various other techniques may be used relating to authorization of a microtransaction requested by a person dealing with a merchant.

To further explain in accordance with one aspect of the invention, it should be appreciated that the fee, i.e., the interchange fee for example, associated with effecting a microtransaction may be relatively small. As a result, it may be desirable to reduce the processing associated with the microtransaction. One manner in which to reduce the processing is to reduce the authorization related processing. For example, the method of the invention in effecting a microtransaction might utilize traditional authorization techniques, or alternatively, might not utilize any authorization. In general, it should be appreciated that authorization of a microtransaction is inversely tied to risk, i.e., of non-payment, associated with the microtransaction. That is, as authorization requirements are decreased, the risk associated with the microtransaction increases. Further, increased risk in the microtransaction results in a question of who should bear the increased risk, i.e., the merchant, alternate interchange entity or the payment enabler, for example.

In accordance with one embodiment, the method of the invention only requires authorization once a problem is detected with a particular customer's account. That is, for example, so long as the customer's monthly payment is received within some time frame, as desired, that customer is allowed to effect a microtransaction without authorization. However, if the customer's monthly payment is not received within some time frame resulting in a "problem account," then authorization will be required for a microtransaction. This technique of the invention might be implemented by providing merchants with information relating to which accounts require authorization, in conjunction with utilizing a "no authorization needed" default. That is, if no information is received by a merchant for a particular account, i.e., a problem account, then the merchant assumes that no authorization is required to process a microtransaction for the account.

As a further alternative in accordance with one embodiment of the invention, the method of the invention does not allow a microtransaction once a problem is detected with a particular customer's account. That is, so long as the customer's monthly payment, for example, is received within some time frame, as desired, that customer is allowed to effect a microtransaction. However, if the customer's monthly payment is not received within some time frame resulting in a problem account, then a microtransaction is not allowed by the merchant. Rather, the customer is then required to utilize traditional techniques for effecting the desired transaction. This technique of the invention is also implemented by providing merchants with information relating to which accounts are problem accounts.

The above techniques of course require that merchants be informed of any problem accounts. Illustratively, in accordance with one embodiment of the invention, merchants who wish to participate in processing microtransactions might contact the payment enabler to sign up, at a cost, for what might be characterized as a "microtransaction service."

The payment enabler will provide updated information regarding problem accounts for all merchants who participate in the microtransaction service. This updated information might be provided utilizing the Internet. In utilizing this arrangement, the merchant who participates in the microtransaction service may limit its risk. In accordance with one embodiment of the invention, the merchant might contact the payment enabler after a predetermined period of time has passed, using a suitable website arrangement, for example. In response, the payment enabler provides updated information to the merchant regarding problem accounts, in conjunction with charging the merchant a fee. This fee might be imposed upon the merchant accessing and using the website, or in some other manner.

So long as the merchant contacts the payment enabler after a predetermined period of time has passed, the payment enabler agrees to assume the risk of non-payment of the microtransaction. However, if the merchant does not contact the payment enabler after a predetermined period of time has passed, the merchant, rather than the payment enabler, will assume the risk of non-payment of the microtransaction. Once the merchant again contacts the payment enabler for updated information, i.e., such that the merchant has current data on "problem accounts" serviced by the payment enabler, the risk will again pass to the payment enabler.

Alternatively, a merchant may decide to process microtransactions, but not participate in the service at all. Accordingly, the merchant will not be informed of problem accounts. If the merchant does not participate in the service, the merchant assumes the risk of non-payment of the microtransaction, in accordance with one embodiment of the invention.

Figure 8:
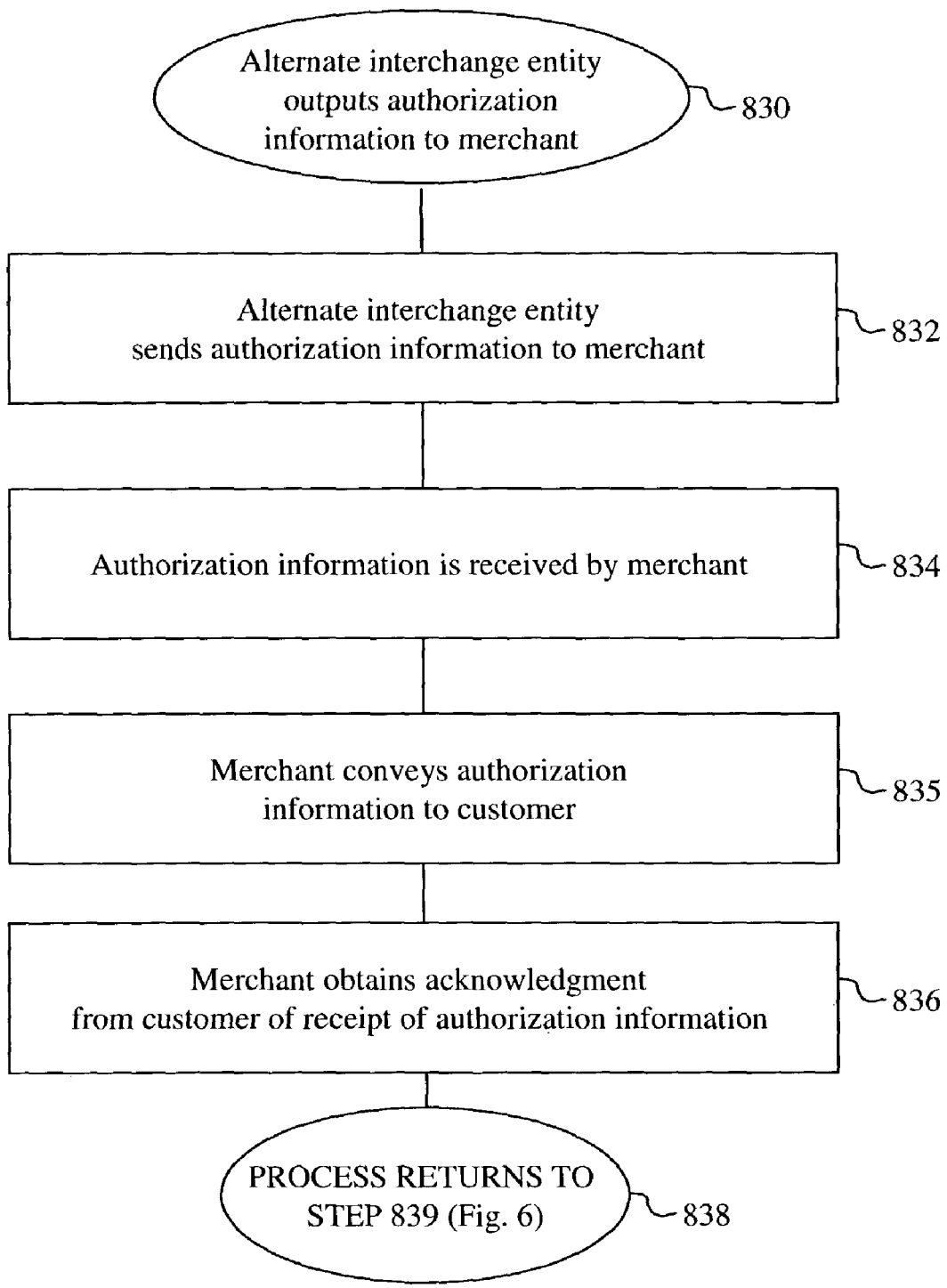
FIG. 8 is a flow chart showing the "Alternate interchange entity outputs authorization information to merchant" step of FIG. 6 in further detail according to one embodiment of the invention.

In further explanation of the method of the invention and the flowcharts, FIG. 8 is a flowchart showing in further detail the "alternate interchange entity outputs authorization information to merchant" step 830 of FIG. 6. That is, in step 830, the authorization information has been obtained through the processing of step 820. This authorization information may then be communicated to the merchant. Accordingly, after step 830, the process passes to step 832. In step 832, the alternate interchange entity sends authorization information to the merchant. Then, in step 834, the authorization information is received by the merchant. After step 834, the process passes to step 835. In step 835, the merchant conveys the authorization information to the customer. The authorization information may contain a variety of information, as is described above.

After step 835, the process passes to step 836. In step 836, the merchant obtains acknowledgement from the customer of receipt of the authorization information. That is, this acknowledgment of receipt from the customer may be deemed necessary to complete the requested microtransaction. In particular, it should be appreciated that the acknowledgement might be desired in the situation where the typical terms, i.e., between the customer and the interchange entity, will not apply since the alternate interchange entity is processing the transaction. After step 836, the process passes to step 838. In step 838, the process returns to step 839, as shown in FIG. 6.

As described above, in step 835 of FIG. 8, the merchant conveys the authorization information to the customer. This is one example of how the customer "sees" the transaction. Any of a variety of other techniques may be utilized to provide the customer with information regarding performed microtransactions, as is desired. This information may pertain to a particular microtransaction or an aggregate of microtransactions. For example, the customer might be mailed a monthly summary bill. Alternatively, the customer might be sent an e-mail each time a microtransaction is performed, in conjunction with a periodic summary bill. Alternatively, the customer might be given access to a website upon which that customer's microtransaction activity is documented. It should be appreciated that any security precautions may be taken in conjunction with such a website, as is desired.

Figure 9:
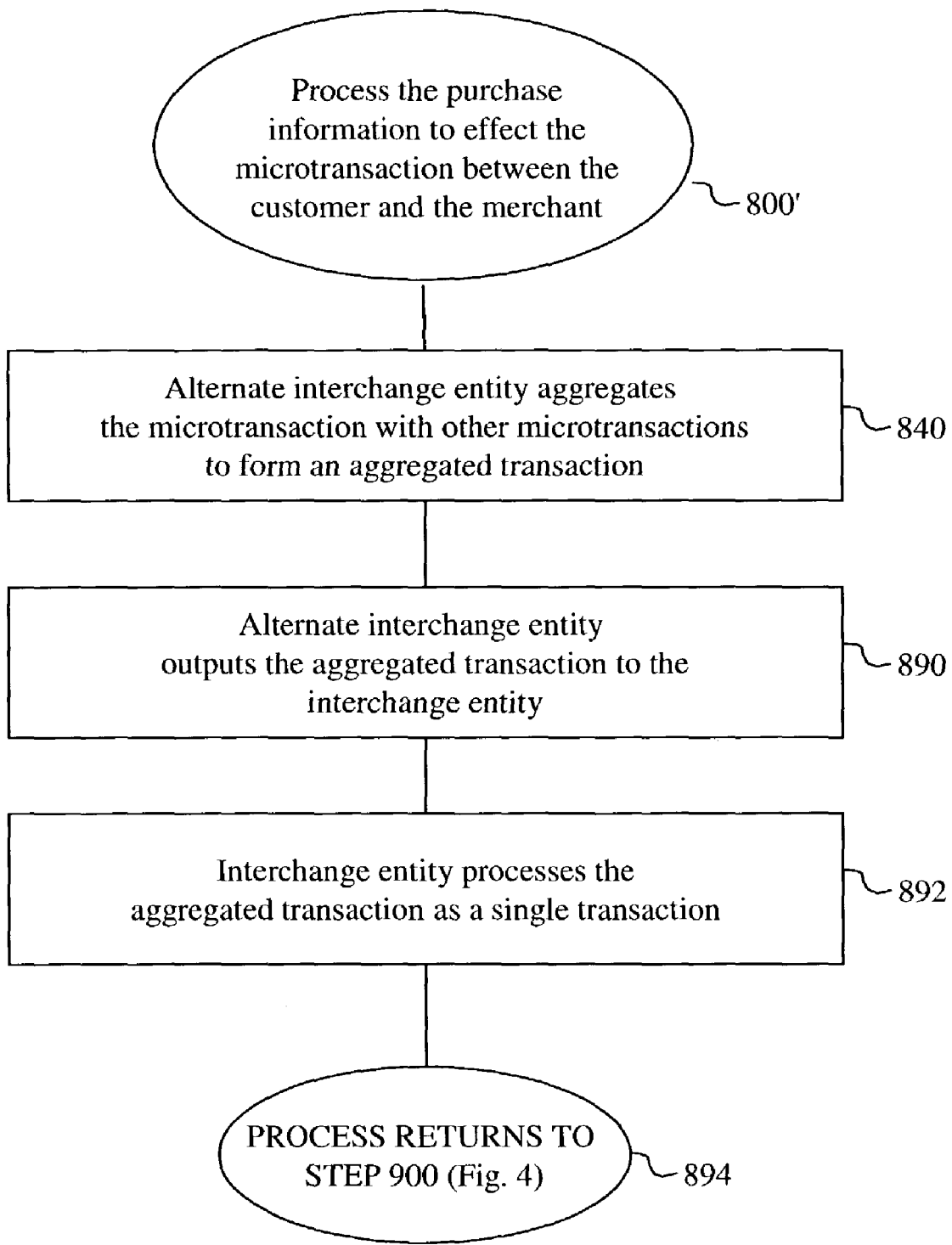
FIG. 9 is a flow chart showing the "Process the purchase information to effect the microtransaction between the customer and the merchant" step of FIG. 4 in further detail according to a further embodiment of the invention.

FIG. 9 is a flow chart showing a different embodiment of the process of FIG. 4. Specifically, the flowchart of FIG. 9 illustrates a further embodiment of the "process the purchase information to effect the microtransaction between a customer and the merchant", which is different from the embodiment set forth in FIG. 6. In particular, the embodiment of the method of the invention as illustrated in FIG. 9 includes the alternate interchange entity 60 interacting with the interchange entity 50, as described below.

As shown in FIG. 9, the process starts in step 800'. After step 800', the process passes to step 840. In step 840, the alternate interchange entity aggregates the microtransaction with other microtransactions to form an aggregated transaction. Further details of step 840, in accordance with two illustrated embodiments, will be described below with reference to FIG. 10 and FIG. 12.

After step 840, the process passes to step 890. In step 890, the alternate interchange entity outputs the aggregated transaction to the interchange entity. Then, the process passes to step 892 in which the interchange entity processes the aggregated transaction as a single transaction, utilizing the typical interchange fee. After step 892, the process passes to step 894. In step 894, the process returns to step 900, as shown in FIG. 4.

Figure 10:
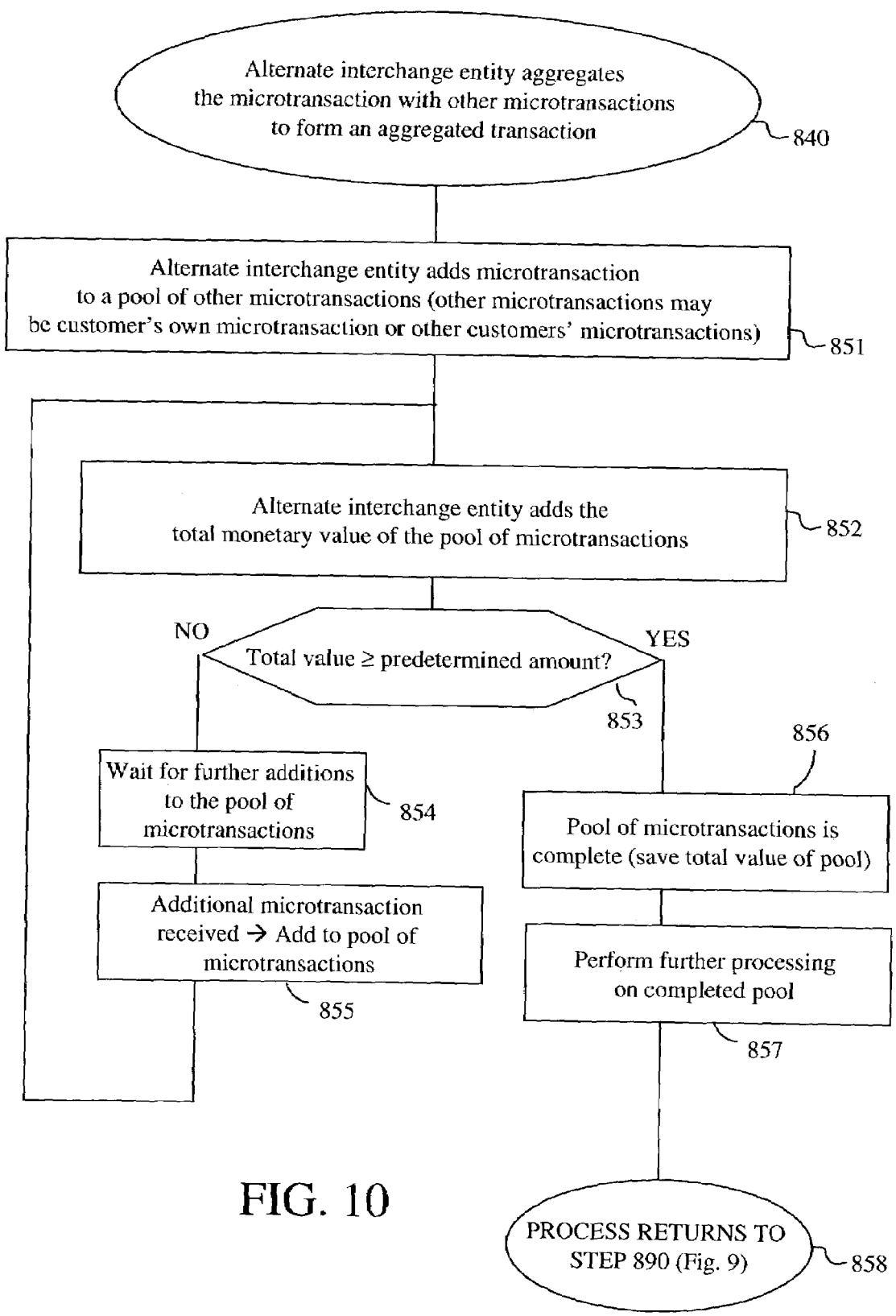
FIG. 10 is a flow chart showing the "Alternate interchange entity aggregates the microtransaction with other microtransactions to form an aggregated transaction" step of FIG. 9 in further detail according to one embodiment of the invention.

As referenced above, FIG. 10 is a flowchart showing in further detail the "alternate interchange entity aggregates the microtransaction with other microtransactions to form an aggregated transaction." As shown in FIG. 10, the subprocess starts in step 840. Then, the process passes to step 851.

In step 851, the alternate interchange entity adds the microtransaction, which was effected between the customer 10 and the merchant portion 30, to a pool of microtransactions. This pool of microtransactions may contain other customers' microtransactions, or alternatively, may contain other microtransactions effected by that particular customer. After step 851, the process passes to step 852. In step 852, the alternate interchange entity adds the total monetary value of the pool of microtransactions.

That is, the alternate interchange entity totals all the microtransactions currently in the pool. For example, 20 transactions each at a dollar amount of $2.00 would result in a total of $40. Then, the process passes to step 853. In step 853, the alternate interchange entity performs a determination whether the total value, as determined in step 852, is greater than or equal to a predetermined amount. This predetermined amount may be determined by the alternate interchange entity based on any of a variety of factors.

The total value of the pool, which has been attained, might not, at this time, exceed the predetermined amount. As a result, the process passes from step 853 to step 854. In step 854, the process waits for further additions to the pool of microtransactions. Further, as illustrated in the subsequent step 855, additional microtransactions may be received and, as a result, added to the pool of microtransactions. Then, the process returns to step 852. In step 852, the alternate interchange entity 60 may again add the total monetary amount of the pool of microtransactions. As a result, the comparison of step 853 may result in a determination that the total value of the microtransactions in the pool does indeed exceed the predetermined amount. This triggers the alternate interchange entity 60 to perform further processing.

Specifically, the process passes from step 853 to step 856. In step 856, the pool of microtransactions is complete and the total value of that pool is saved into a suitable memory. Thereafter, further processing is performed on the completed pool, as shown in step 857. Further details of step 857 are described below with reference to FIG. 11. After step 857, the process passes to step 858 as shown in FIG. 10. In step 858, the process returns to step 890 of FIG. 9.

Figure 11:
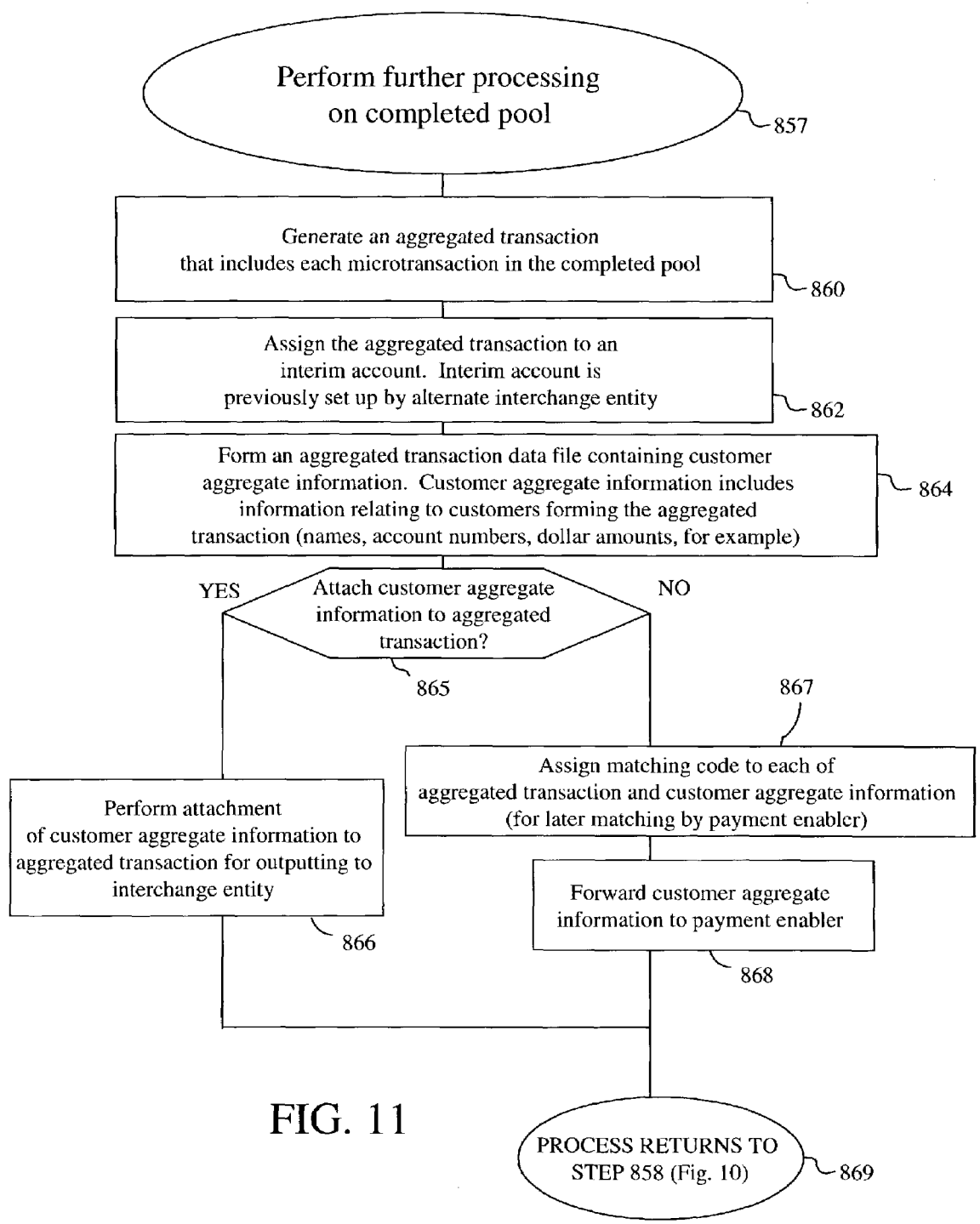
FIG. 11 is a flow chart showing the "Perform further processing on completed pool" step of FIG. 10 in further detail according to one embodiment of the invention.

As referenced above, FIG. 11 is a flow chart showing in further detail the "perform further processing on the completed pool" step 857 of FIG. 10. As shown in FIG. 11, the process passes from step 857 to step 860.

In step 860, the alternate interchange entity 60, in accordance with one embodiment of the invention, generates an aggregated transaction that includes each microtransaction in the completed pool, which was generated as described above. Then, the process passes to step 862. In step 862, the alternate interchange entity assigns the aggregated transaction to an interim account. This interim account is controlled by the alternate interchange entity and, in accordance with this embodiment of the invention, was previously set up by the alternate interchange entity.

As described below, this aggregated transaction will be forwarded from the alternate interchange entity to the interchange entity for processing as a single transaction. Accordingly, the interchange fees are substantially reduced for each microtransaction in the pool forming the aggregated transaction. It should be appreciated that this reduced interchange fee may indeed be applied to each microtransaction in some suitable manner. For example, the interchange fee associated with the single transaction, processed by the interchange entity 50, may be proportionately distributed between the microtransactions in the pool based on the dollar amount of each microtransaction. Alternatively, other suitable techniques or methodologies might be utilized to allocate and distribute the single interchange fee that is due to the interchange entity 50. For example, the single interchange fee might be distributed based on riskiness of the transaction and/or based on an arrangement with a merchant possibly involving volume discounts, for example. Further, for example, the allocation of an interchange fee might be reduced for a particular customer based on activities of the customer.

For example, the allocation of an interchange fee might be reduced based on the particular customer clicking and viewing an advertisement on the web, for example. Alternatively, the allocation of an interchange fee might be allocated based on the activities of a merchant. For example, the allocation might be based on the volume of sales observed by a merchant on a particular day, since at the end of the day the merchant will process all the sales for that day as an aggregated transaction, in accordance with one embodiment of the invention. As the volume of sales increases, the cost to each customer decreases.

After step 862, the process passes to step 864. In step 864, the alternate interchange entity 60 forms an aggregated transaction data file containing customer aggregate information. The customer aggregate information includes information relating to customers performing the aggregated transaction. This information might include, for example, names, account numbers, or dollar amounts, for example.

In accordance with one embodiment of the invention, the aggregated transaction will be forwarded through the interchange entity as a single transaction and subsequently forwarded to the payment enabler. As a result, the payment enabler must be able to determine the particular customers, and their associated microtransactions, that make up the aggregated transaction. The aggregated transaction data file provides the information by which the payment enabler 40 may perform this allocation. Further details of this process are described below.

In further explanation of FIG. 11, once the customer aggregate information is assembled in a data file, the process passes to step 865. In step 865, the alternate interchange entity makes a determination whether the customer aggregate information is to be or not to be attached to the aggregated transaction, i.e., the aggregated transaction that will be forwarded to and processed by the interchange entity 50. The decision of step 865 may be determined based on an established protocol or various parameters, as is desired.

Illustratively, the protocol may dictate that the customer aggregate information is not to be attached to the aggregated transaction. As a result, the process passes from step 865 to step 867. In step 867, the alternate interchange entity 60 assigns a matching code to each of the aggregated transaction, which will be forwarded through the interchange entity, and to the customer aggregate information, which will be forwarded directly to the payment enabler 40. This matching code information will be utilized by the payment enabler 40 for a later matching. This will allow the payment enabler 40 to determine the particular microtransactions that make up an aggregated transaction. After step 867, the process passes to step 868. In step 868, the alternate interchange entity forwards the customer aggregate information to the payment enabler 40. Then, the process passes to step 869.

Alternatively, in step 865, the process may determine that the customer aggregate information is indeed to be attached to the aggregated transaction. As a result, the process passes from step 865 to step 866. In step 866, the alternate interchange entity performs an attachment of the customer aggregate information to the aggregated transaction for outputting to the interchange entity. For example, the customer aggregate information may be contained in a suitable data file which is attached to the aggregated transaction information. After step 866, the process passes to step 869.

Accordingly, subsequent to either of step 868 or step 866, the process passes to step 869. In step 869, the process returns to step 858, as shown in FIG. 10.

Figure 12:
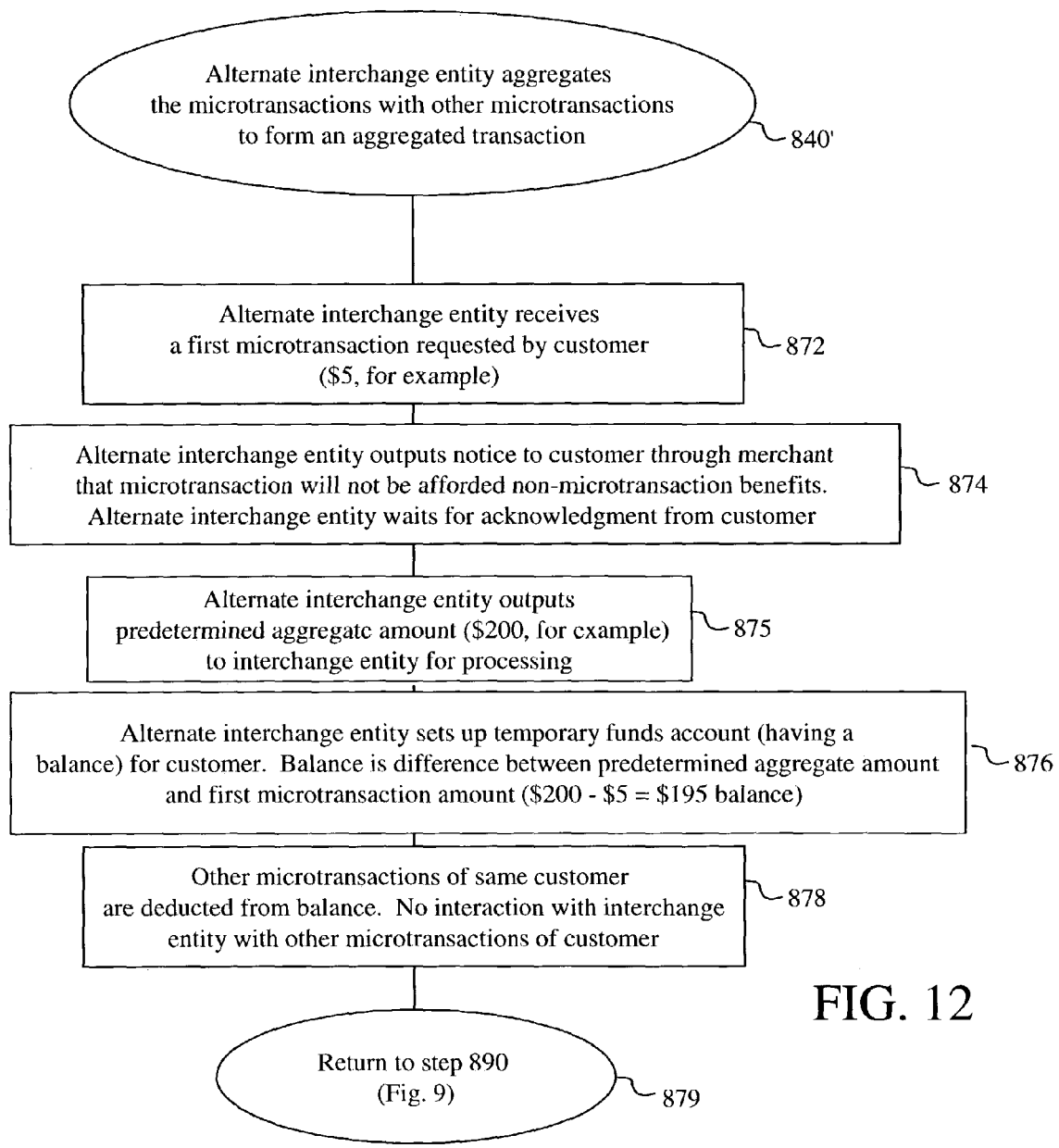
FIG. 12 is a flow chart showing the "Alternate interchange entity aggregates the microtransaction with other microtransactions to form an aggregated transaction" step of FIG. 9 in further detail according to a further embodiment of the invention.

FIG. 12 is a flow chart showing in further detail the "Alternate interchange entity aggregates the microtransactions with other microtransactions to form an aggregated transaction" step 840 of FIG. 9 in accordance with a further embodiment of the invention. In summary, the process of FIG. 12 illustrates an embodiment of the invention in which a predetermined aggregate amount is generated and submitted to the interchange entity upon an initial microtransaction being requested by the customer.

As shown in FIG. 12, the process starts in step 840' and passes to step 872. In step 872, the alternate interchange entity receives a first microtransaction request by the customer. Illustratively, the monetary amount of this microtransaction may be $5.00, for example. After step 872, the process passes to step 874.

In step 874, the alternate interchange entity outputs a notice to the customer, through the merchant, that the microtransaction will not be afforded non-microtransaction benefits. Further, to ensure that the customer is aware of this aspect of the microtransaction being processed, the alternate interchange entity waits for acknowledgement from the customer. This acknowledgement may be provided through the merchant to the alternate interchange entity in any suitable manner.

After step 874, the processes passes to step 875. In step 875, the alternate interchange entity generates and outputs a predetermined aggregate amount to the interchange entity for processing. For example, this amount may be in the monetary amount of $200. It should be appreciated that the typical interchange fee will be applied to what appears to the interchange entity as a single transaction of $200. After step 875, the process passes to step 876.

In step 876, the alternate interchange entity sets up a temporary funds account for the customer. This temporary funds account possesses a balance. As might be expected, the balance is the difference between the predetermined aggregate amount, i.e., that was submitted to the interchange entity, and the first microtransaction amount. Accordingly, in the example above, the initial balance of the temporary funds account would be $200 minus $5 equals $195 a balance.

After step 876, the process passes to step 878. In step 878, the customer effects further microtransactions. These further microtransactions requested by the same customer are deducted from the balance of $195. It should be appreciated that no interaction with the interchange entity 50 occurs with these further microtransactions. That is, the customer merely interacts with the alternate interchange entity 60 to progressively work down the balance of a temporary funds account maintained by the alternate interchange entity. After step 878, the process passes to step 879. In step 879, the process returns to step 890 of FIG. 9.

In accordance with a further aspect of the invention, the alternate interchange entity may also perform a role of authentication of a previous purchase of goods or services, for example, that were effected via a microtransaction. For example, a consumer products reporting entity might charge a three-dollar fee to view product reports each three months, i.e., a microtransaction. Accordingly, an alternate interchange entity might initially process the three-dollar microtransaction, in accordance with one of the embodiments described herein for example, and then maintain a repository or database of microtransactions. Further, at some later time after processing the microtransaction, the alternate interchange entity may then be contacted to authenticate the transaction. Accordingly, the alternate interchange entity functions as a authentication facility.

Figure 13:
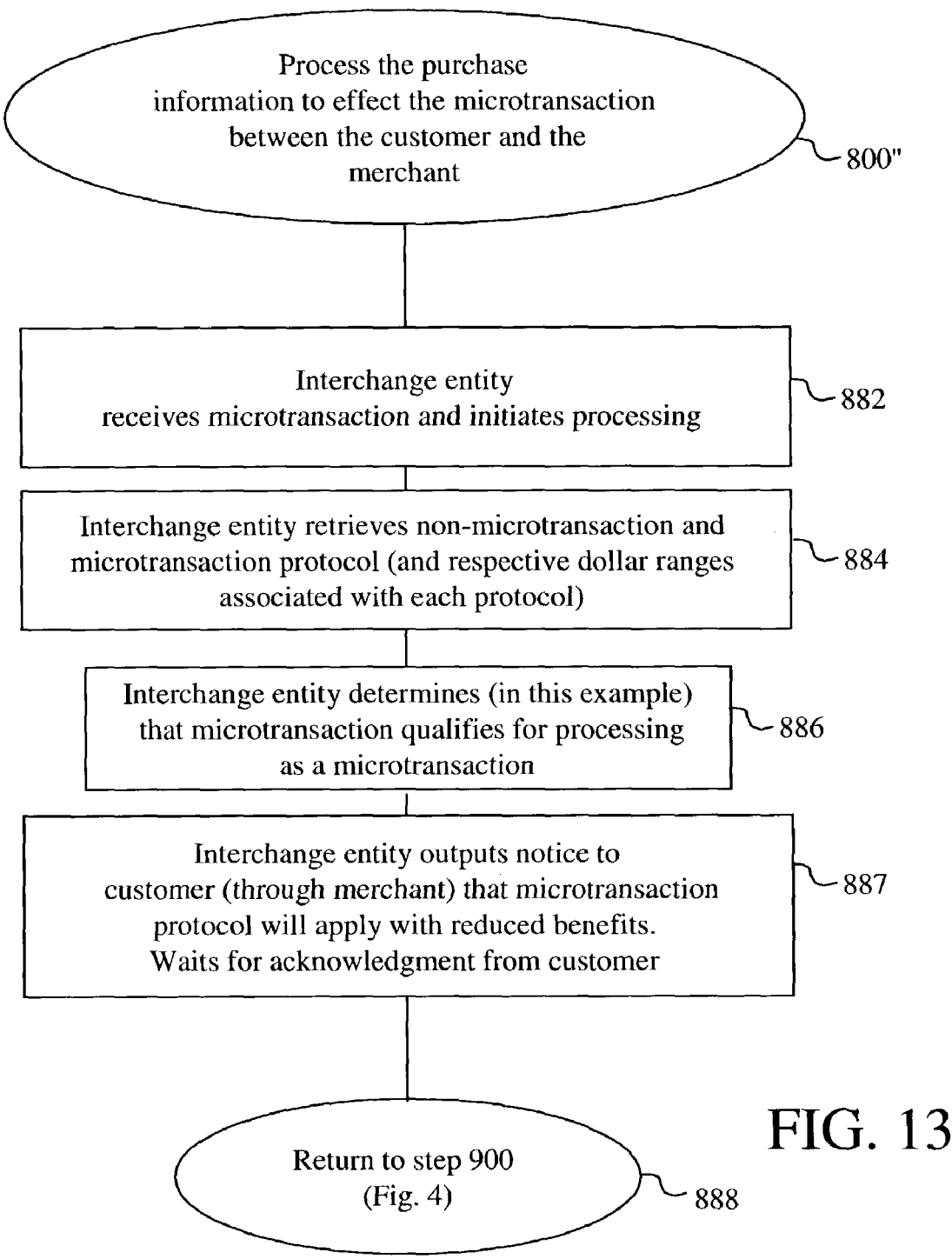
FIG. 13 is a flow chart showing the "Process the purchase information to effect the microtransaction between the customer and the merchant" step of FIG. 4 in further detail according to a yet further embodiment of the invention.

FIG. 13 is a flow chart showing in further detail, the "Process the purchase information to effect the microtransaction between the customer and the merchant" step of FIG. 4, in accordance with a yet further embodiment of the invention. That is, FIG. 13 illustrates a variation to the embodiments shown in FIG. 6 and FIG. 9.

Further, the process illustrated in FIG. 13 illustrates a situation where the interchange entity utilizes different protocols for microtransactions and non-microtransactions, respectively. That is, the microtransactions receive less benefits, for example, than non-microtransactions. One example of less benefits might be that the customer has a limited ability to argue a transaction. As a result, the interchange entity charges a lower interchange fee thus making the microtransactions cost effective for both the interchange entity and the customer. Further, the embodiment illustrated in FIG. 13 illustrates a situation in which the customer and the merchant interact directly with the interchange entity 50.

As shown in FIG. 13, the process starts in step 800". After step 800", the process passes to step 882. In step 882, the interchange entity 50 receives the microtransaction, which was transmitted from the merchant portion, and initiates processing. After step 882, the process passes to step 884.

In step 884, the interchange entity retrieves both of the non-microtransaction protocol, as well as the microtransaction protocol. Further, each of these protocols have respective dollar ranges, for example as might be the case in the United States, associated with them. For example, the microtransaction protocol may have a monetary range of $0 to $20, for example. After step 884, the processes passes to step 886.

In step 886, the interchange entity 50 determines, in accordance with this illustrative example, that the microtransaction indeed qualifies for processing as a microtransaction. Then, in step 887, the interchange entity outputs an appropriate notice to the customer. For example, this notice might be transmitted through the merchant.

Specifically, the notice provides information to the customer indicating that the microtransaction protocol will apply and that such protocol will provide reduced benefits to the customer for the microtransaction. Thereafter, in accordance with the embodiment shown in FIG. 13, the interchange entity 50 waits for acknowledgement from the customer. After step 887, the process passes to step 888. In step 888, the process returns to step 900 of the FIG. 4. As described above, in step 900, the transaction is completed. Accordingly, the systems and methods of the invention provide effective and efficient techniques to process a microtransaction.

In accordance with one embodiment of the invention, it should be appreciated that the time of day may affect what is and is not a microtransaction, i.e., what is the dollar threshold. For example, a fast-food restaurant may use the microtransaction processing of the invention during only peak hours, such as from 11 am to 2 pm. It is during these hours that the restaurant may deem that the speed and convenience of the microtransaction processing, over traditional credit card processing, is justifiable, i.e., as weighed against the increased risk of fraudulent transactions. Accordingly, the processing system of the merchant might process all transactions which (1) occur between 11 am to 2 pm, and (2) involve less than five dollars, as microtransactions. However, at other times, no transactions are processed using the microtransaction processing of the invention. Alternatively, at other times, only transactions that are less than three dollars might be processed as microtransactions. Any of a wide variety of arrangements are possible depending on the particular business needs of a merchant.

In general, it should be appreciated that the microtransaction processing in accordance with some embodiments of the invention, may be more susceptible to fraud then traditional credit card transactions. However, the increased throughput, for example, provided by the microtransaction processing may outweigh the risk of increased losses. Nevertheless, it may be desired to implement further security precautions not present in traditional credit card processing, as desired. For example, the dollar amount of a user's pool of funds may be monitored. As a result, abnormal increases in the balance of a funds account may be detected and closely monitored for possible fraud.

As shown in FIG. 1, the alternate interchange entity is separate from the merchant portion and other processing components. However, in accordance with further embodiments of the invention, the alternate interchange entity may be combined with another component of FIG. 1. For example, the alternate interchange entity 60 might be combined with the merchant portion 30, i.e., so as to function as one processing portion.

In explanation of further aspects of the invention, the customer interacts with a merchant, such as described above and shown in FIG. 1, so as to initiate a microtransaction. In accordance with one embodiment of the invention, the interaction between the customer 10 and the merchant portion 30 may be performed using a radio frequency device, radio frequency identification device, or some other signal transmission device. Such a device might trigger microtransaction processing, as described herein, directly. Illustratively, the radio frequency device outputs a signal to a suitable receiving device at the merchant portion. To explain, the radio frequency device may be physically carried by the customer, such as in the customer's watch, in the customer's key chain, for example, or in some other device carried by the customer. The customer might then initiate a purchase at a merchant's store. Upon prompting by the merchant, the customer effects the transmission of information from the radio frequency device, controlled by the customer, to a suitable merchant receiving device, i.e., such as a device connected to the merchant's cash register, for example. The customer might push a button on the radio frequency device, for example. The receipt of the information by the merchant receiving device, from the customer's radio frequency device, initiates the microtransaction. Such a radio frequency device might be particularly useful in a toll booth situation or a fast food restaurant situation, for example.

In accordance with one embodiment of the invention, the customer's radio frequency device might be dedicated only to microtransactions. Accordingly, upon receipt of the information from the customer's radio frequency device, the merchant receiving device would immediately identify the transaction as a microtransaction. Further, the transaction information might then be automatically forwarded to a microtransaction network. The radio frequency device described above, might be used in conjunction with any of the other features described herein. Further, it should be appreciated that other devices, as described herein, might be dedicated exclusively for microtransactions. Accordingly, the use of such a device itself, by a customer, would trigger the use of a microtransaction network. Thus, such an exclusive device might not be used for larger dollar amount non-microtransactions.

As described above, FIGS. 1-3 show one embodiment of the system of the invention. Further, FIGS. 4-13 show various steps of one embodiment of the method of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented method for processing a microtransaction, the method comprising:
receiving a purchase request having one or more electronic information packets comprising purchase information of a purchase initiated by a customer interacting with a merchant, the customer using a transaction account, the purchase request including a purchase amount;

accessing a microtransaction threshold amount;

determining whether the purchase amount is below the microtransaction threshold amount;

when the purchase amount is above the microtransaction threshold amount, processing the purchase information through a first interchange entity as a non-microtransaction; and when the purchase amount is below the microtransaction threshold amount:

electronically routing the purchase information to a second interchange entity, and processing the purchase information to effect the microtransaction between the customer and the merchant, wherein:

the second interchange entity aggregates the microtransaction with other microtransactions to form an aggregated transaction and outputs the aggregated transaction to the first interchange entity, and the first interchange entity processes the aggregated transaction as a single transaction.

2. The method of claim 1, wherein the microtransaction threshold amount is $20.

3. The method of claim 1, wherein the microtransaction threshold amount is $15.

4. The method of claim 1, wherein the customer interacting with the merchant is performed over the internet.

5. The method of claim 1, wherein the customer interacting with the merchant is performed over a telephone network or a private network.

6. The method of claim 1, wherein the customer interacting with the merchant is performed through person to person interaction.

7. The method of claim 1, wherein the purchase information includes the purchase price and at least one of a transaction account number, a customer name, and a merchant name.

8. The method of claim 1, wherein the transaction account is one of a credit card and a debit card.

9. The method of claim 1, wherein the second interchange entity aggregates the customer microtransaction with other microtransactions by combining the microtransaction with the other microtransactions that are effected by other customers of a payment enabler corresponding to the transaction accounts of said customers, so as to form the aggregated transaction.

10. The method of claim 9, further including the second interchange entity forming an interim account, the aggregated transaction being associated with the interim account; and the first interchange entity processing the aggregated transaction in connection with the interim account.

11. The method of claim 10, wherein the aggregated transaction is associated with customer aggregate information containing information relating to those customers corresponding to the aggregated transaction.

12. The method of claim 11, wherein the customer aggregate information is forwarded to the payment enabler through the first interchange entity.

13. The method of claim 11, wherein the customer aggregate information is forwarded to the payment enabler separate from the aggregated transaction, such that the customer aggregate information does not pass through the first interchange entity.

14. The method of claim 13, wherein the customer aggregate information is communicated directly from the second interchange entity to the payment enabler.

15. The method of claim 11, wherein the customer aggregate information includes customer identification and purchase price information for each of the microtransactions.

16. The method of claim 9, wherein the aggregated transaction is created upon the customer microtransaction and the other microtransactions collectively attaining, in monetary value, a predetermined amount.

17. The method of claim 16, wherein the predetermined amount is $500.

18. The method of claim 1, wherein the other microtransactions are other microtransactions of the customer, and the aggregating the microtransactions with other microtransactions includes collecting a plurality of the microtransactions of the customer, to collectively form the aggregated transaction.

19. The method of claim 18, wherein the second interchange entity outputting the aggregated transaction to the first interchange entity is performed once the microtransaction and the other microtransactions collectively attain, in monetary value, a predetermined amount.

20. The method of claim 18, wherein the second interchange entity outputting the aggregated transaction to the first interchange entity is performed upon the first microtransaction being received by the second interchange entity, the aggregated transaction being, in monetary value, a predetermined aggregate amount; and the second interchange entity generating a temporary funds account having a balance, the balance being the difference between the aggregate amount and the purchase price.

21. The method of claim 20, wherein the other microtransactions are deducted from the balance once each of the other microtransactions is processed by the second interchange entity.

22. The method of claim 21, further including the second interchange entity providing notice to the customer that the microtransaction will not be afforded the same benefits as non-microtransaction benefits.

23. A computer readable medium for processing a microtransaction, the computer readable medium comprising:

a first set of instructions to receive a purchase request having one or more electronic information packets comprising purchase information of a purchase initiated by a customer interacting with a merchant, the customer using a transaction account, the purchase information including a purchase amount;

a second set of instructions to access a microtransaction threshold amount;

a third set of instructions to determine whether the purchase price is below a microtransaction threshold amount, wherein:

when the purchase price is above the microtransaction threshold amount, the purchase information is processed through a first interchange entity as a non-microtransaction, and when the purchase price is below the microtransaction threshold amount, the purchase is processed through a second interchange entity as a microtransaction; and a fourth set of instructions to forward the purchase information for processing based on whether the purchase request is a non-microtransaction or a microtransaction, wherein:

the purchase information of the non-microtransaction is processed through a first interchange entity for processing, and the purchase information of the microtransaction is electronically routed to a second interchange entity for processing, wherein:

the second interchange entity aggregates the microtransaction with other microtransactions to form an aggregated transaction and outputs the aggregated transaction to the first interchange entity, and the first interchange entity processes the aggregated transaction as a single transaction.

24. The computer readable medium of claim 23, wherein the fourth set of instructions causes a plurality of microtransactions to be grouped into a pool, prior to forwarding the purchase information.

25. The method of claim 1, wherein the customer interacting with the merchant is performed using a radio frequency device, the radio frequency device outputting information to the merchant to initiate the microtransaction.

26. The method of claim 25, wherein the radio frequency device is disposed in a key chain possessed by the customer.

27. The method according to claim 1, wherein the outputting of the aggregated transaction is triggered by one or more events selected from a group comprising:

a predetermined time of the day;

an amount of time that has elapsed since a first microtransaction is received by the second interchange entity;

a total number of microtransactions received or aggregated by the second interchange entity; or a total dollar amount of microtransactions received or aggregated by the second interchange entity.

28. The method according to claim 1, wherein:

the purchase is a non-microtransaction when the purchase amount is equal to or above the predetermined monetary amount; and the purchase is a microtransaction when the purchase amount is below the predetermined monetary amount.

29. The method according to claim 1, wherein:

the purchase is a non-microtransaction when the purchase amount is above the predetermined monetary amount; and the purchase is a microtransaction when the purchase amount is equal to or below the predetermined monetary amount.

30. The method according to claim 1, wherein the purchase amount includes the purchase price and tax.

31. The method according to claim 1, wherein the purchase amount comprises the purchase price.

32. The method according to claim 1, wherein the purchase request is electronically routed to the first interchange entity or the second interchange entity based on the determination with respect to the microtransaction payment threshold.

* * * * *

UNITED STATES PATENT AND TRADEMARK OFFICE
CERTIFICATE OF CORRECTION

PATENT NO. : 7,627,521 B1 Page 1 of 1
APPLICATION NO. : 10/339596
DATED : December 1, 2009
INVENTOR(S) : Sheehan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1910 days.

Signed and Sealed this

Twenty-first Day of December, 2010

David J. Kappos
*Director of the United States Patent and Trademark Office*